United States Patent
Ohtake

(10) Patent No.: US 7,199,941 B2
(45) Date of Patent: Apr. 3, 2007

(54) ZOOM LENS

(75) Inventor: Motoyuki Ohtake, Saitama (JP)

(73) Assignee: Sony Corporation (JP)

( * ) Notice: Subject to any disclaimer, the term of this patent is extended or adjusted under 35 U.S.C. 154(b) by 277 days.

(21) Appl. No.: 10/963,563

(22) Filed: Oct. 14, 2004

(65) Prior Publication Data
US 2005/0099700 A1 May 12, 2005

(30) Foreign Application Priority Data
Oct. 29, 2003 (JP) ............................. P2003-369089

(51) Int. Cl.
G02B 15/14 (2006.01)
(52) U.S. Cl. .................. 359/687; 359/684; 359/685; 359/686
(58) Field of Classification Search ................ 359/684, 359/685, 686, 687
See application file for complete search history.

(56) References Cited
U.S. PATENT DOCUMENTS
5,886,828 A 3/1999 Kim

FOREIGN PATENT DOCUMENTS
JP 62-206516 9/1987
JP 04-043311 2/1992
JP 04-361214 12/1992
JP 05-107473 4/1993
JP 06-308388 11/1994
JP 07-270684 10/1995
JP 09-281392 10/1997
JP 2003-228001 8/2003

OTHER PUBLICATIONS
Partial EPO Search Report; Dec. 31, 2005; Application No. EP 04292569.

Primary Examiner—David N. Spector
(74) Attorney, Agent, or Firm—Rader, Fishman, & Grauer PLLC; Ronald P. Kananen

(57) ABSTRACT

There is provided a zoom lens capable of achieving stable optical quality even at the time of manufacture. The zoom lens includes a first lens group having positive refraction, a second lens group having negative refraction, a third lens group having positive refraction, and a fourth lens group having positive refraction, each being arrayed in this order from an object side, wherein: when a magnification changes from a wide-angle end condition having the shortest focal length to a telescopic end condition having the longest focal length, the first lens group and the third lens group are fixed in predetermined positions relative to the optical axis direction; the second lens group moves to the image side; and the fourth lens group moves to compensate fluctuation of the position of the image plane which is generated following moving of the second lens group.

32 Claims, 17 Drawing Sheets

FIG. 3
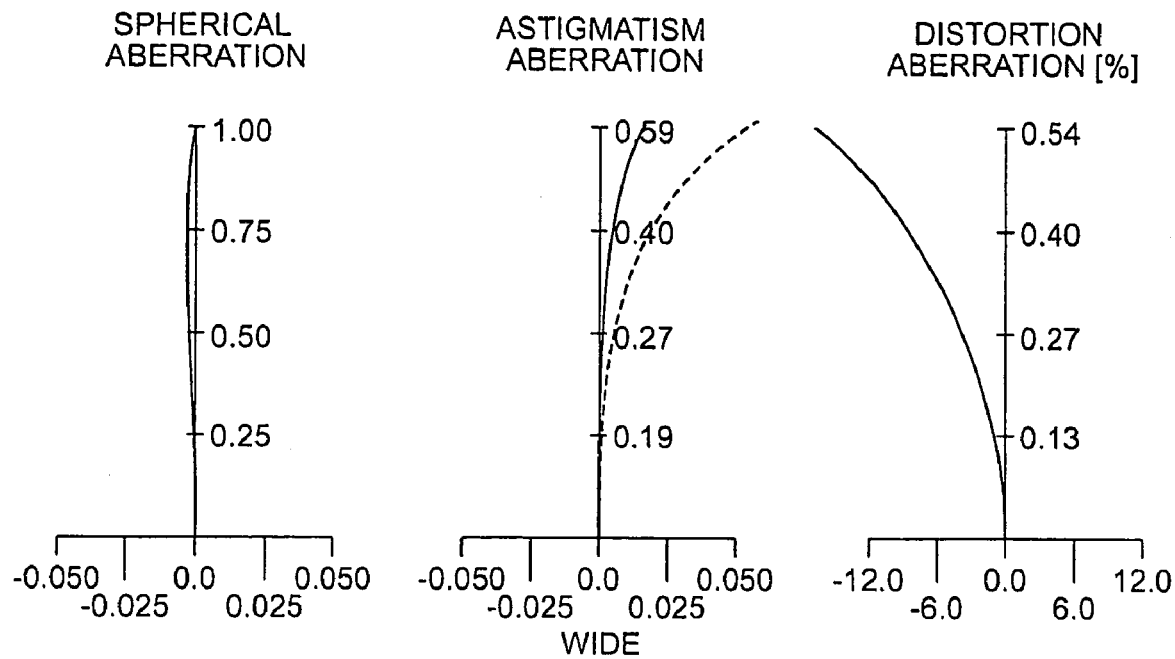
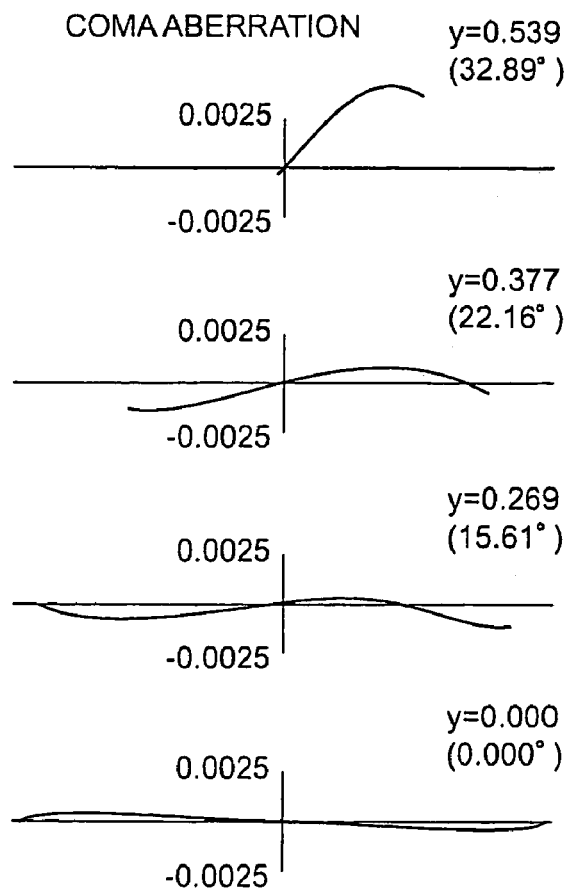

FIG. 4
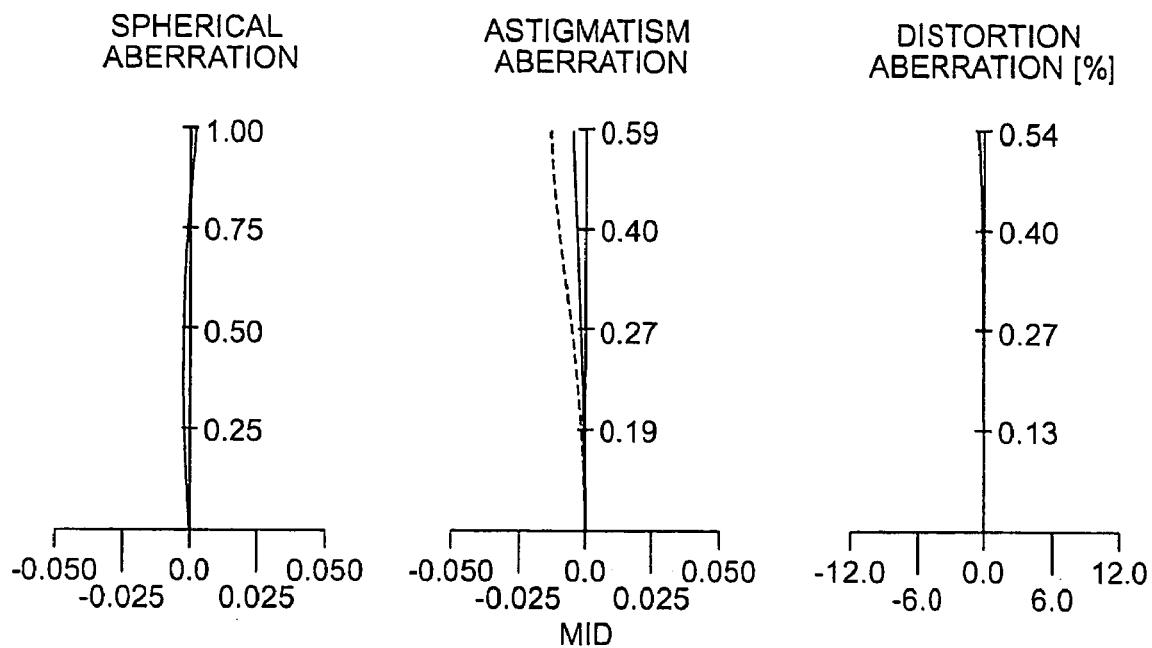
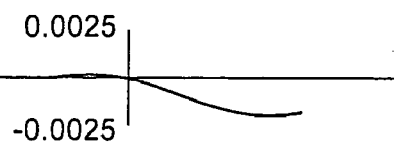
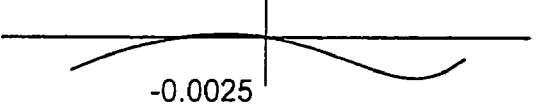
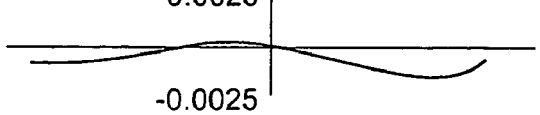
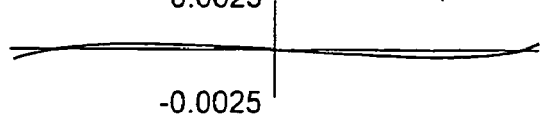

FIG. 5
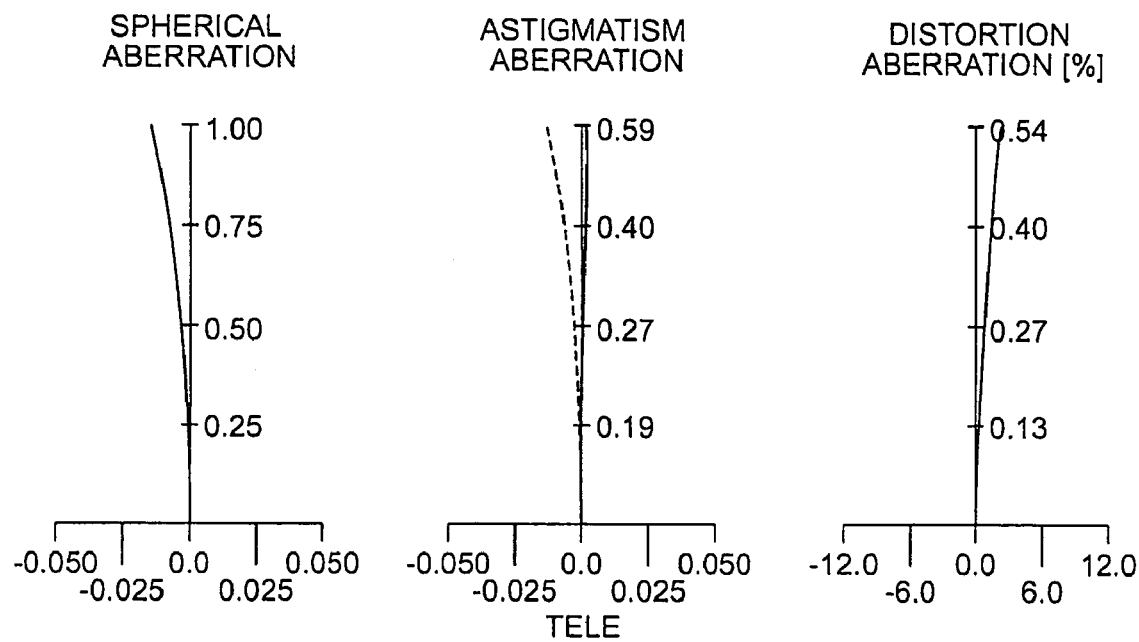
TELE
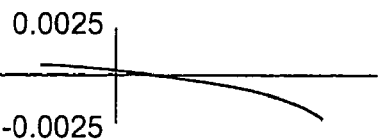
y=0.539
(3.314°)
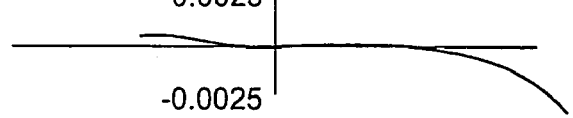
y=0.377
(2.348°)
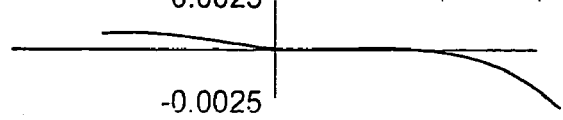
y=0.269
(1.686°)
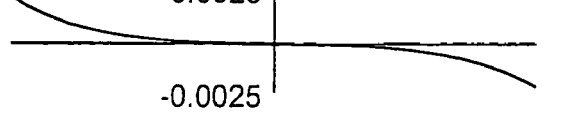
y=0.000
(0.000°)

FIG. 7
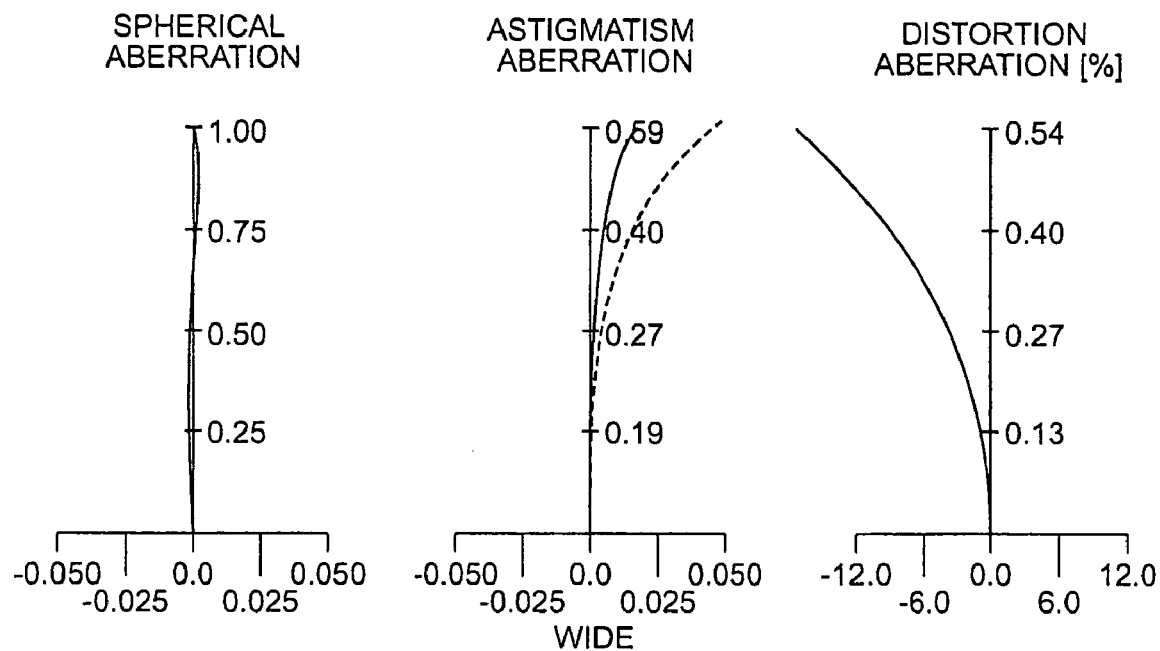
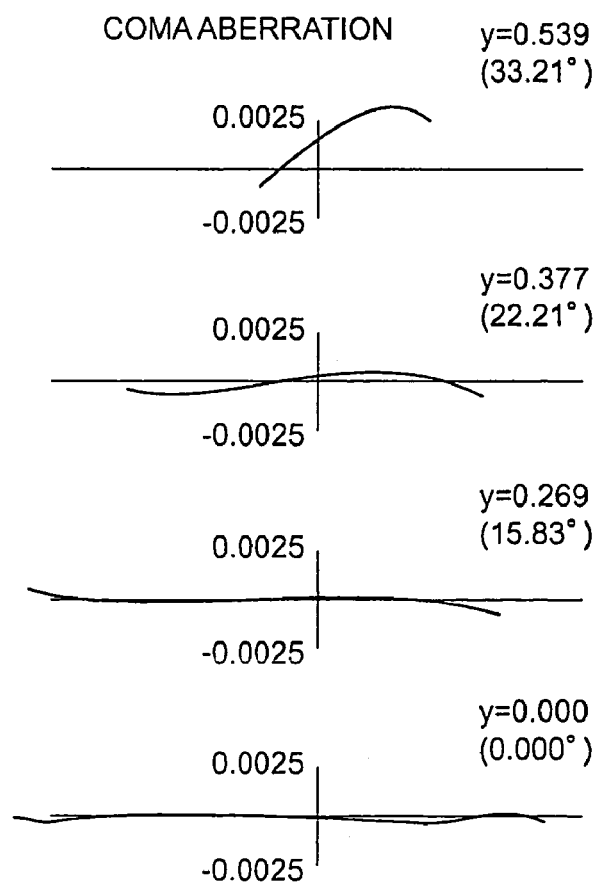

FIG. 8
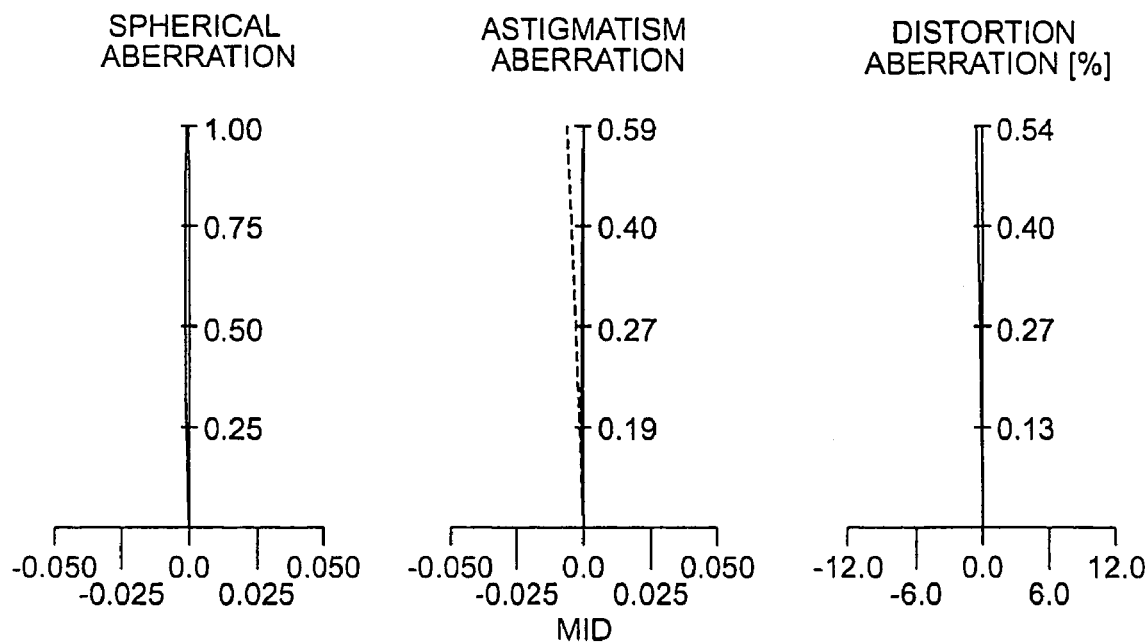
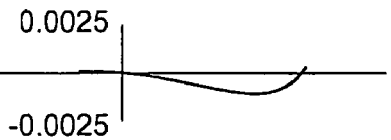
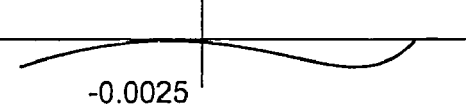
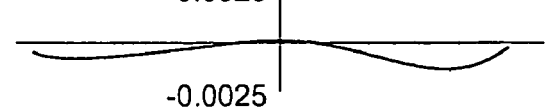
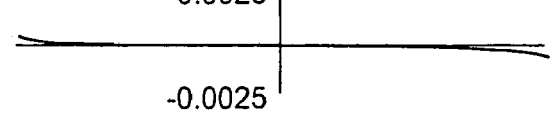

FIG. 9
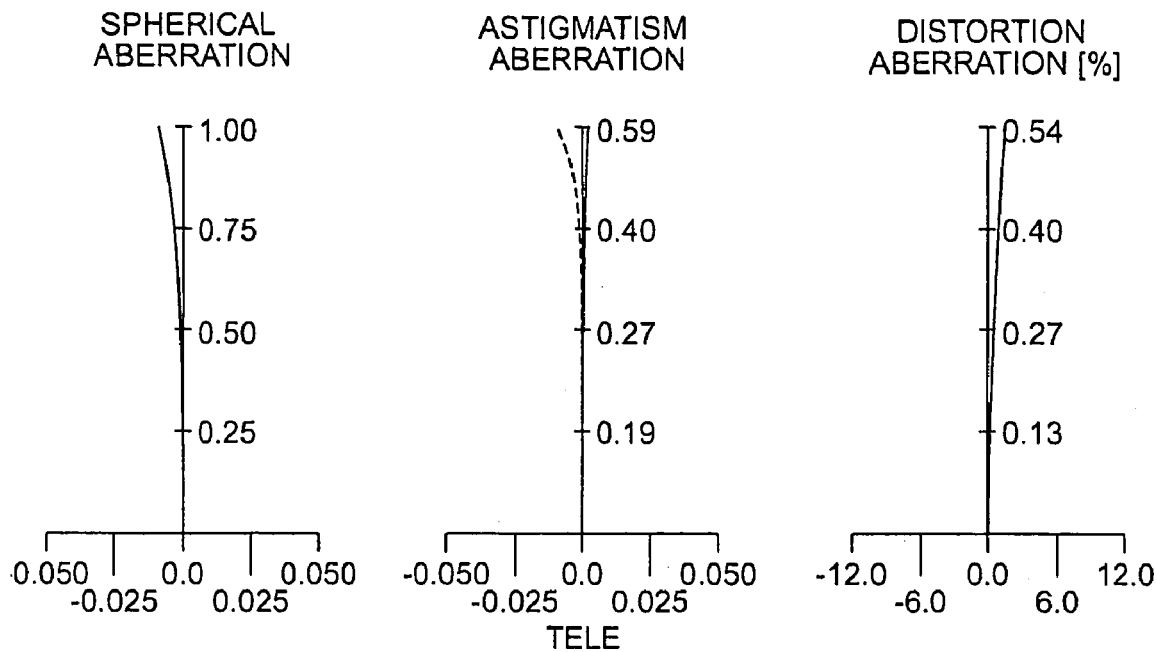
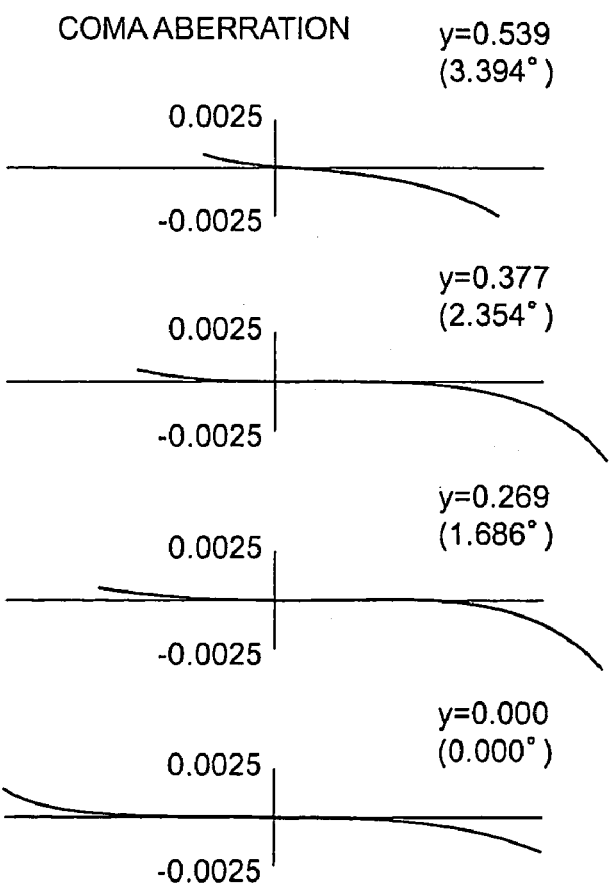

FIG. 11
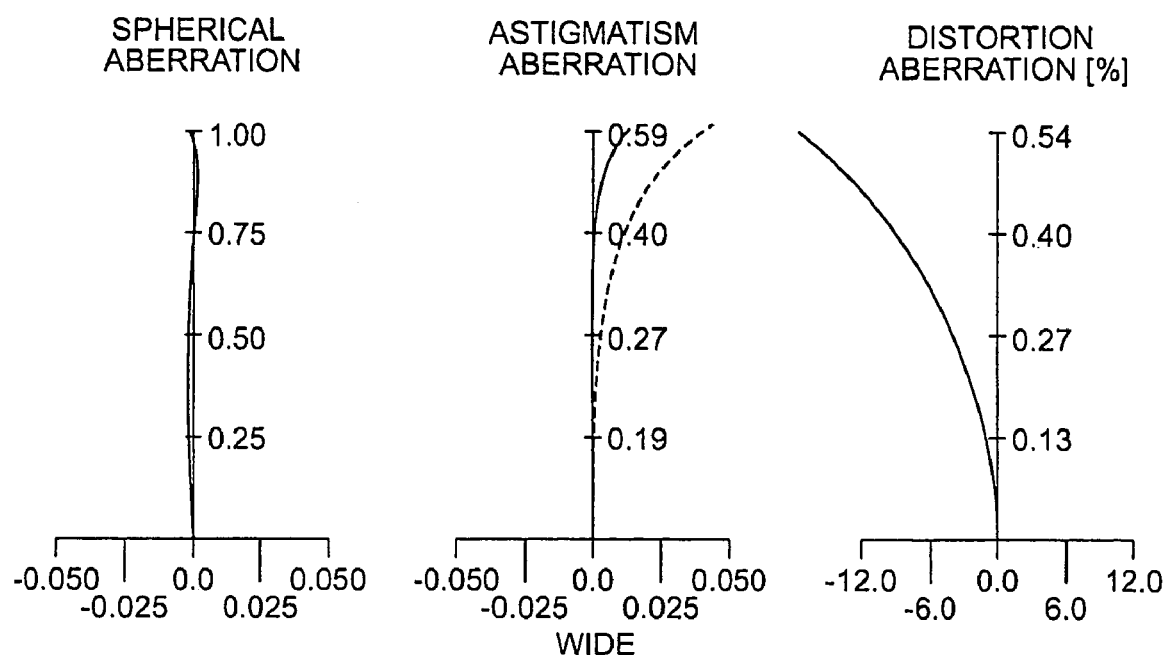
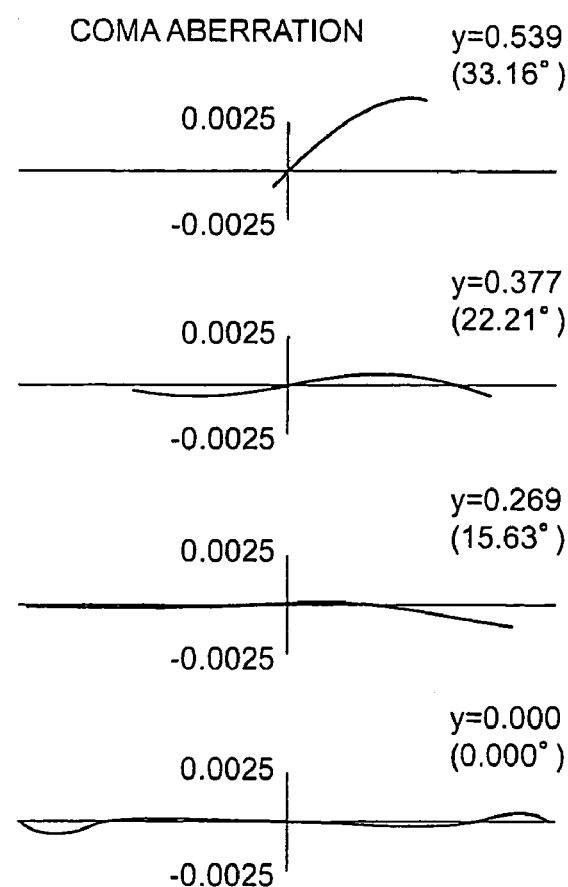

FIG. 12
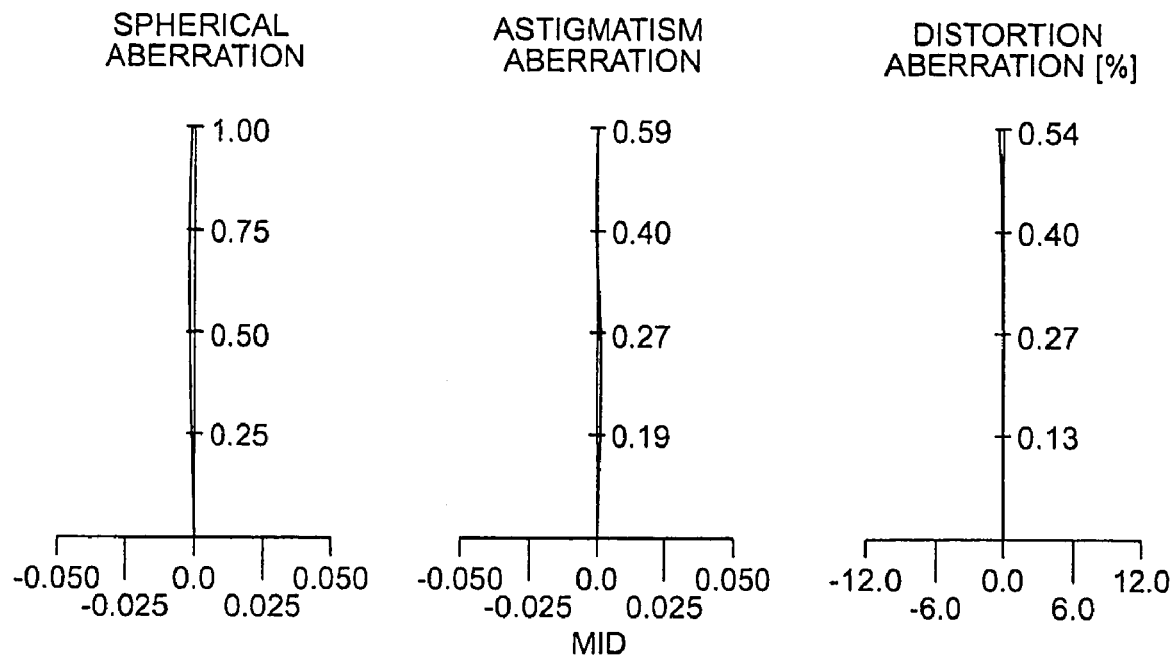
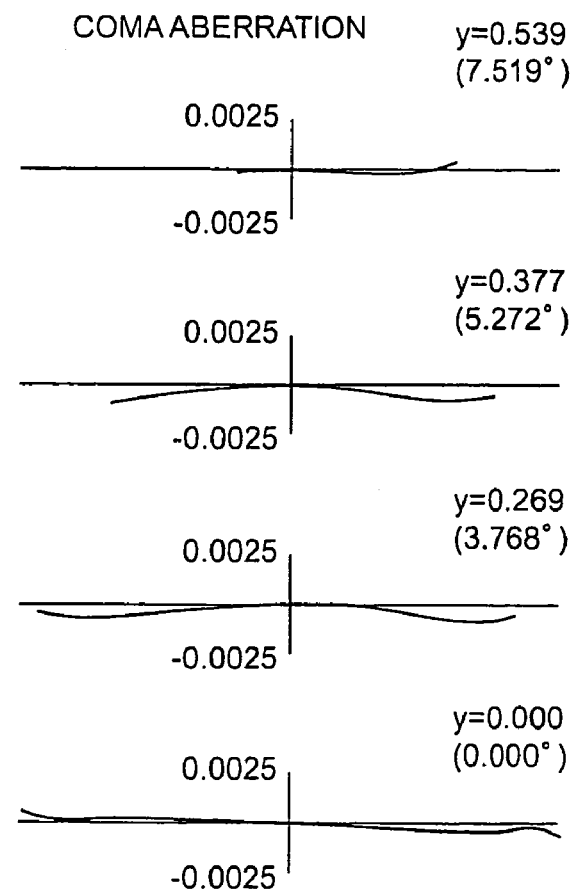

FIG. 13
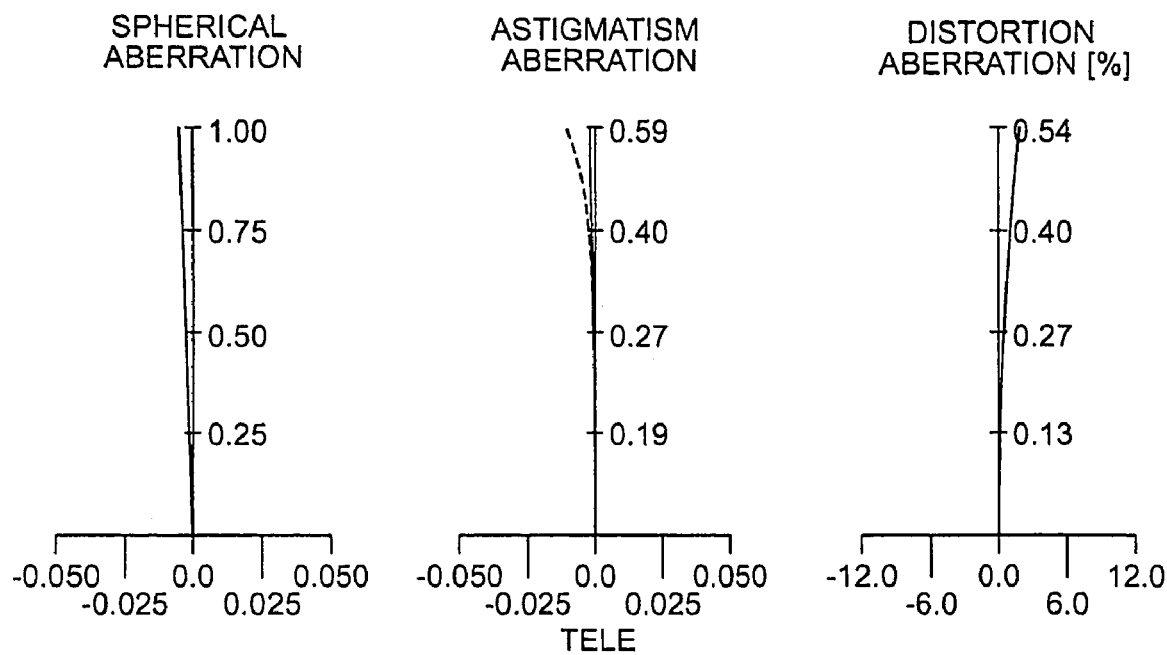
TELE
COMA ABERRATION
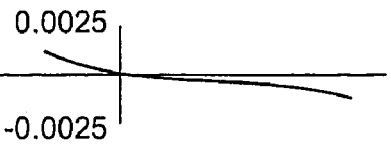
y=0.539
(3.325°)
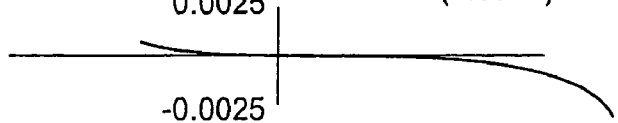
y=0.377
(2.352°)
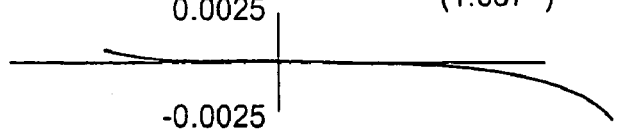
y=0.269
(1.687°)
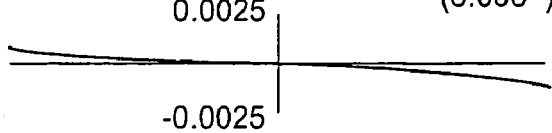
y=0.000
(0.000°)

FIG. 15
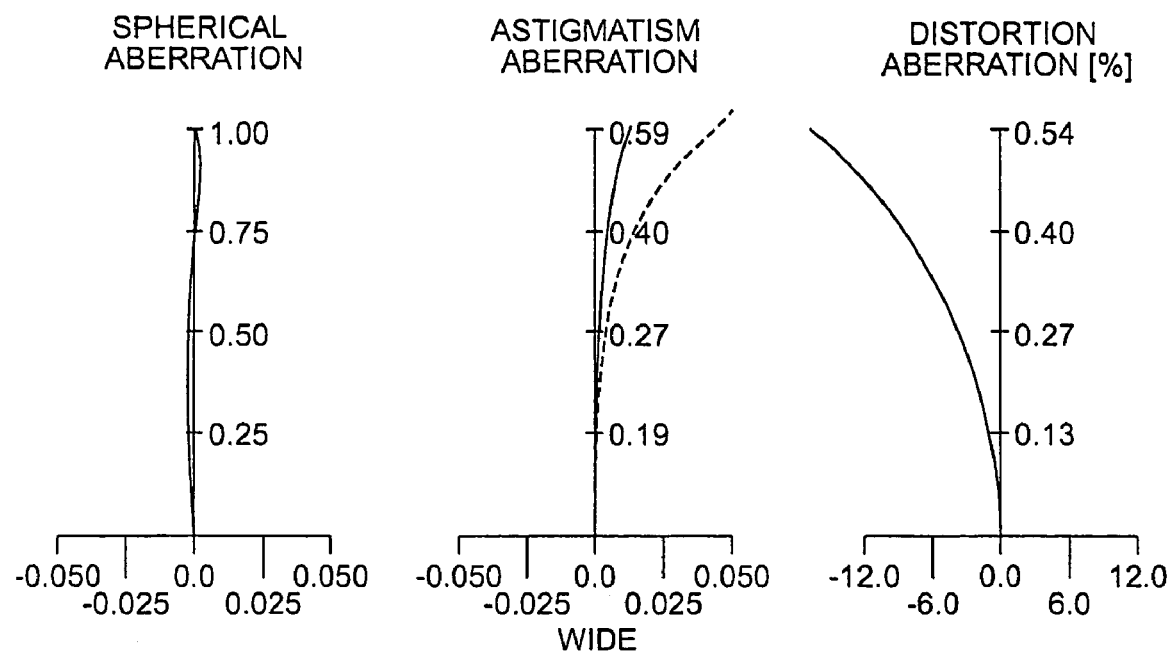
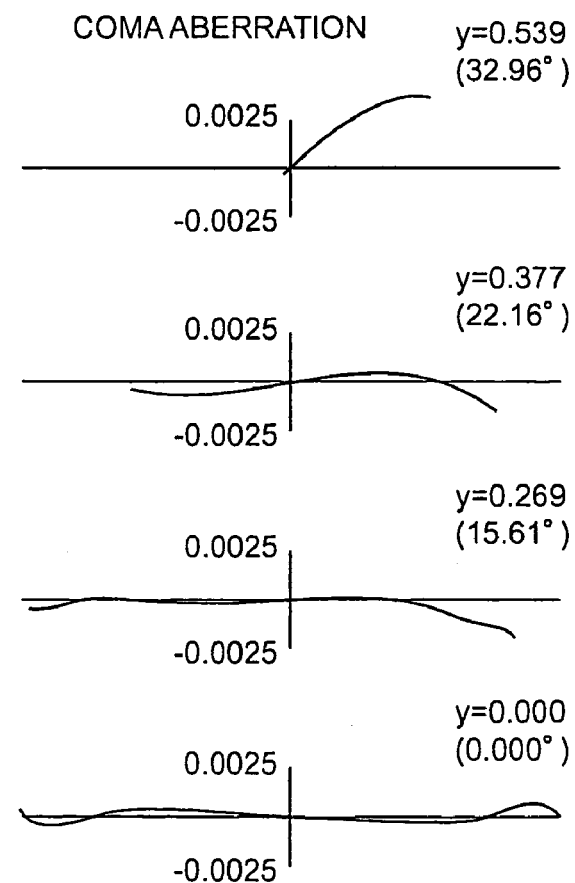

FIG. 16
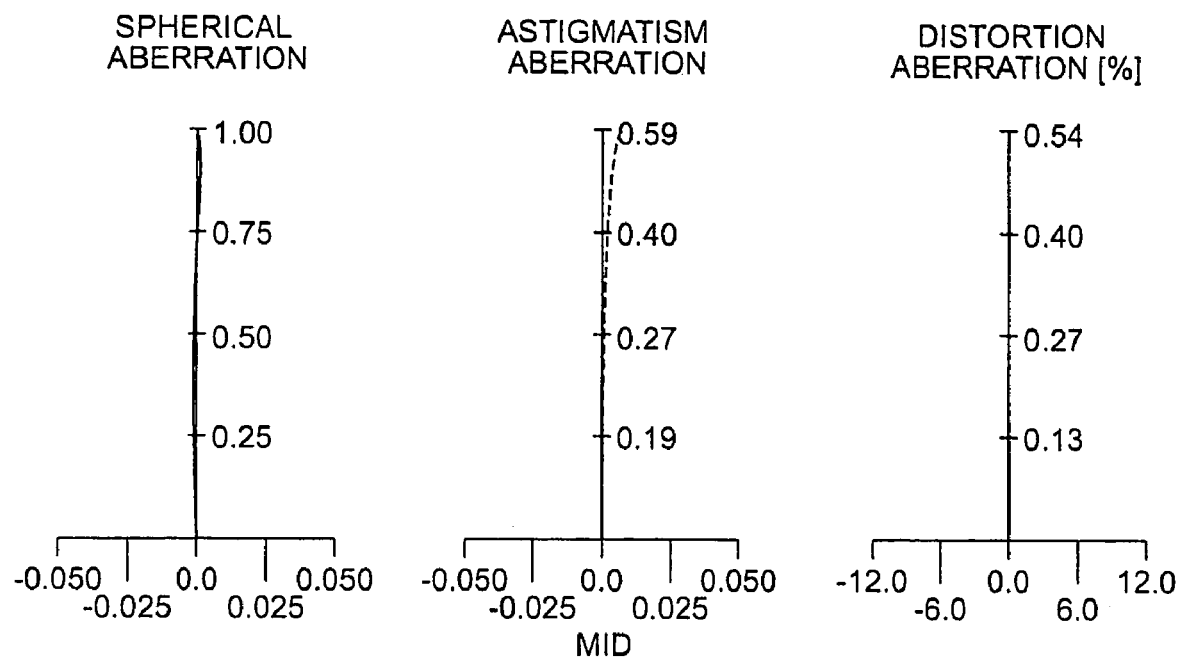
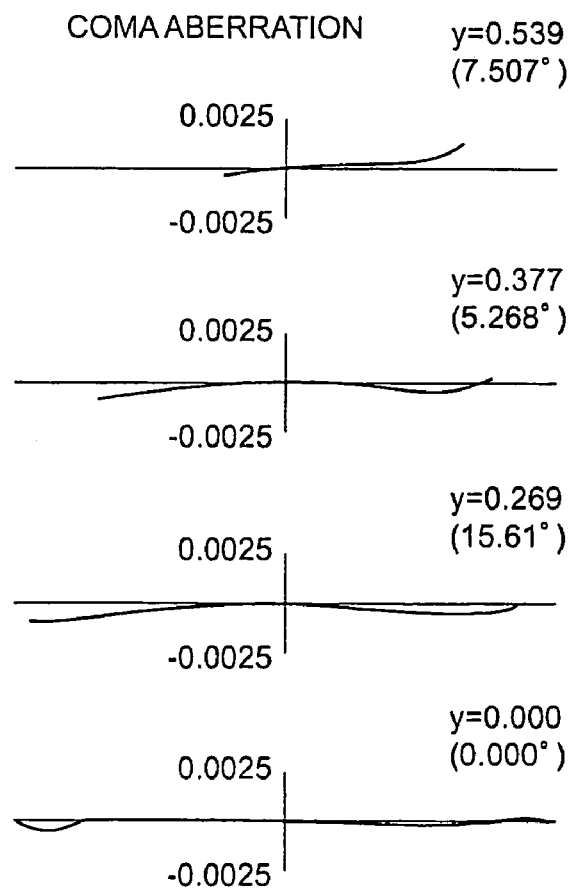

FIG. 17
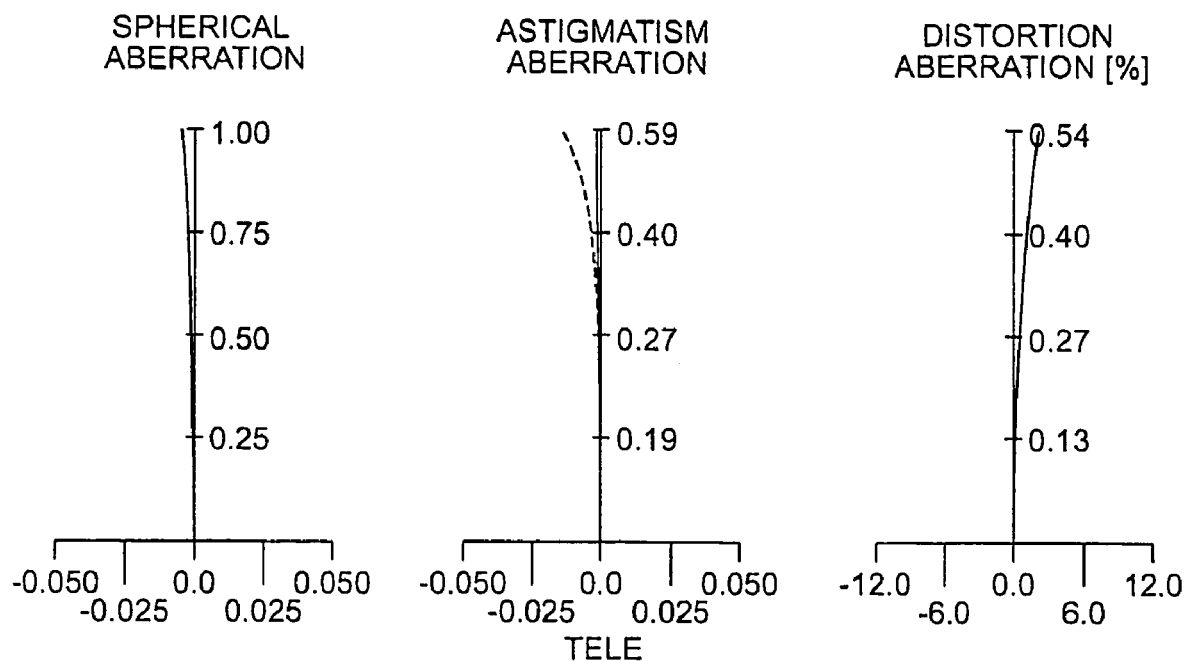
TELE
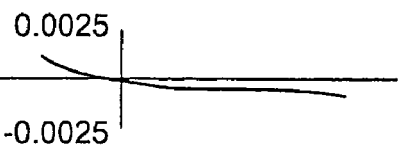
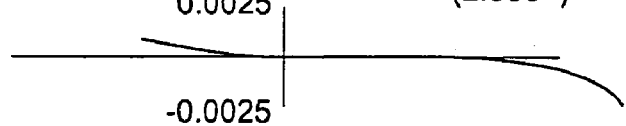
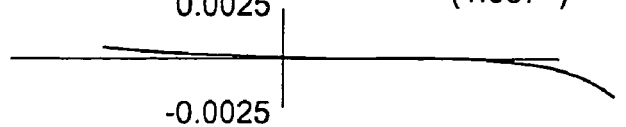
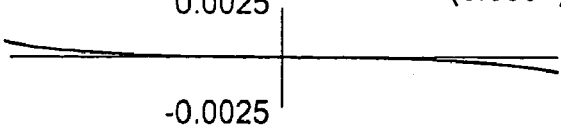

ZOOM LENS

CROSS REFERENCES TO RELATED APPLICATIONS

The present invention claims priority to its priority document No. 2003-369089 filed in the Japanese Patent Office on Oct. 29, 2003, the entire contents of which being incorporated by reference herein.

BACKGROUND OF THE INVENTION

1. Field of the Invention

The present invention relates to a novel zoom lens, and particularly to a zoom lens suitable for a camera, such as a video camera and a digital still camera, which receives an incident light by an image pick up element.

2. Description of Related Art

As recording means in a camera, there is known a conventional method of converting and recording a quantity of light per image pick up element of an object image formed on the surface of the image pick up element to an electrical output by an image pick up element using an photo-electric conversion element such as a CCD (Charge Coupled Device) and a CMOS (Complementary Metal-Oxide Semiconductor).

With the progress of fine processing technology in recent years, high-speed of a central processing unit (CPU) and high packing density of recording media have been made, thus realizing to process huge volumes of imaging data at high speed hitherto beyond processing. Further, high packing density and miniaturization have been made with regard to the light-receiving element, so that the high packing density made it possible to record in higher spatial frequencies, and miniaturization made it possible to make a camera small as a whole.

However, through the above-mentioned high packing density and miniaturization, there was a problem in which a light-receiving surface area of each photo-electric conversion element became narrow, thus increasing noise as in electric output decreases. To prevent this, the quantity of light to reach over the light-receiving element was increased by enlarging the aperture ratio of the optical system, and a minute lens element (so-called micro lens array) was provided immediately before each element. The above-mentioned micro lens array, instead of guiding the optical flux reaching between adjacent elements on to the elements, position of an injection pupil of the lens system was restricted. Namely, it is because, as an angle formed by a main light ray reaching the light-receiving element relative to the optical axis becomes large, a off-axis flux of light towards a periphery of a image plane makes a large angle relative to the optical axis, resulting in not reaching over the light-receiving element and causing a shortage of the quantity of light.

Various proposals have been made regarding inventions of zoom lenses suitable for cameras which record the image of an object through these photo-electric conversion elements.

As a zoom lens for the video camera, there is in the main stream a so-called positive-negative-positive-positive 4-group zoom lens consisting of four lens groups of a positive lens group, a negative lens group, a positive lens group, and a positive group in that order from the object side. Especially, in regard to variable magnification, there used to be in the main stream a zoom type in which the first lens group and the third lens group were set relative to an optical axis direction, the second lens group functioned as a variator, and the fourth lens group functioned as a compensator. Specifically, for example, a zoom lens listed in Patent Document 1 is known.

With higher packing density of recent light-receiving elements, the lens system has been made compact while its performance has improved. Especially, to provide for a compact and higher performance system, it is essential to correct properly fluctuations of various aberrations which accompany changes in the state of lens positional status (from the wide angle-end condition to the telescopic end condition).

In the positive-negative-positive-positive 4-group zoom lens, there is only one lens group having negative refraction, thus creating a problem of difficulty to correct negative distortion-aberration in the wide-angle end condition. Especially, since the variator belonged to the second lens group, it was difficult to weaken refraction of the second lens group because of necessity to obtain a preset ratio of variable magnification, so that it was necessary to correct the negative distortion-aberration through other lens groups. Consequently, the third lens group used to include a group of a positive part (part having positive refraction) and a group of a negative part (part having negative refraction) such that negative distortion-aberration which tended to occur in the wide-angle end condition could be properly corrected. At the same time, since the third lens group converged the flux of light diverged by the second lens group, it had strong positive refraction. For the above-mentioned reasons, the structure of the third lens group was important.

Specifically, for example, in a zoom lens described in Patent Document 2, the third lens group consisted of a convex lens, a convex lens, and a concave lens. In a zoom lens described in Patent Document 3, by constituting the third lens group with a cemented lens of a biconvex lens, a convex lens, and a concave lens, it was so designed to suppress performance deterioration due to mutual decentering generating inside the third lens group at the time of manufacture.

Further, in a zoom lens described in Patent Document 4, the third lens group consisted of a convex lens and a concave lens, while the fourth lens group consisted of a positive lens.

[Patent Document 1]
  Japanese Published Patent No. Sho62-206516

[Patent Document 2]
  Japanese Published Patent No. Hei6-308388

[Patent Document 3]
  Japanese Published Patent No. Hei9-281392

[Patent Document 4]
  Japanese Published Patent No. Hei5-107473

[Patent Document 5]
  Japanese Published Patent No. Hei4-361214

[Patent Document 6]
  Japanese Published Patent No. Hei4-43311

SUMMARY OF THE INVENTION

Nevertheless, conventional zoom lenses have not fully solved the problem of lens structure of the third lens group. Because the third lens group had strong positive refraction and was comprised of a positive part of the group and a negative part of the group which was provided with an air space between the positive part of the group and the object side thereof, there was a problem that even the minute mutual decentering generating at the time of manufacture considerably deteriorated its optical performance.

For example, as shown in a zoom lens described in Patent Document 5, there is a method of constituting the third lens group with the biconvex lens and the negative lens in which a convex surface thereof faces the object side. However, there was a problem in that the number of lenses constituting the fourth lens group became so many as to increase its necessary work load (=weight×amount of movement) when varying the magnification. Or, in Patent Document 6, there is disclosed a zoom lens whose third lens group includes the biconvex lens, a biconcave lens, and the biconvex lens. Nonetheless, a lens surface on the object side of the positive lens, which is provided closest to the object side, (biconvex lense) shows strong convexity towards the object side, and at the same time, a lens surface on the image side of the biconcave lens provided in the third lens group shows strong concavity towards the image side. As a result, considerable deterioration of its performance has occurred due to the mutual decentering generating in the third lens group at the time of manufacture.

Accordingly, in view of the above-mentioned problems, it is the object of the present invention to provide a zoom lens which can accomplish stable optical quality even at the time manufacture.

To accomplish the above-mentioned issue, a zoom lens according to the embodiment of the present invention includes a first lens group G1 having positive refraction, a second lens group G2 having negative refraction, a third lens group G3 having positive refraction, and a fourth lens group G4 having positive refraction, each being arrayed in order from the object side, wherein:

when the lens positional status changes from the wide-angle end condition to the telescopic end condition, the first lens group G1 and the third lens group G3 are fixed in a predetermined positions relative to the optical axis direction; as the second lens group G2 moves to the image side, fluctuation of the position of an image plane which is generated following movement of the second lens group G2 is compensated by the movement of the fourth lens group G4; as the lens positional status changes, the aperture stop fixed in the optical axis direction is provided on the object side of the third lens group G3; and the third lens group G3 includes a cemented lens including a positive lens in which a convex surface thereof faces the object side and a negative lens in which a concave surface thereof faces the image side, and a positive lens, each being arrayed in order from the object side.

Consequently, a zoom lens according to an embodiment of present invention is capable of suppressing deterioration of performance due to the mutual decentering generated inside the third lens group G3.

While the positive part of the group and the negative part of the group conventionally exist as separate elements in the third lens group, with respective parts being built in a lens barrel, in a zoom lens according to the embodiment of the present invention, the cemented lens including the positive lens in which a convex surface thereof faces the object side and the negative lens in which a concave surface thereof faces the image side, is provided closest to the object side, so that the lens surface on the object side of the positive lens performs a function of the positive part of the group, whereas the lens surface on the object side of the negative lens performs a function of the negative part of the group, thereby enabling the parts performing different functions to be incorporated in the lens barrel as one element and making it possible to secure stable optical quality by suppressing the mutual decentering of the two parts which may possibly generate at the time of manufacture.

Further, according to the embodiment of the present invention, in the above-mentioned zoom lens, the cemented lens and the positive lens to be set inside the third lens group G3 are provided with an air space in between and constituted so as to come in contact at the periphery of the lens outside the passing range of the effective flux of rays, wherefore the mutual decentering between the cemented lens and the positive lens which may possibly generate at the time of manufacture is suppressed, thus securing further stable optical quality.

According to the embodiment of the present invention, it is possible to correct properly distortion-aberration and coma aberration, because a following conditional formula (1) is met $$4<(R3a+R3b)/fw\cdot Fnow<7 \tag{1}$$

where $R3a$ is a radius of curvature of a lens surface, which is closest to the object side, of the third lens group G3, $R3b$ is a radius of curvature of a lens surface of the third lens group G3 closest to the image side, fw is a focal length of the entire lens system in the wide-angle end condition, and Fnow is an aperture ratio in the wide-angle end condition.

According to the embodiment of the present invention, since a following conditional formula (2) is met $$1.1<D3a/fw \tag{2}$$

where $D3a$ is a center thickness of the cemented lens that is placed in the third lens group G3, it is possible to correct properly negative spherical aberration.

According to the embodiment of the present invention, the lens surface, which is closest to the image side, of the third lens group G3 in which a convex surface of the lens surface faces the object side; and a following conditional formula (3) is met $$1<|R3b|/Db<10 \tag{3}$$

where $R3b$ is a radius of curvature of the lens surface, which is closest to the image side, of the third lens group G3, and Db is a distance on the axis from the aperture stop to the lens surface, which is closest to the image side, of the third lens group G3, thus reducing the generation of coma aberration at the periphery of the image plane and making it possible to suppress performance deterioration due to the mutual decentering between the third lens group G3 and the fourth lens group G4.

According to the embodiment of the present invention, a following conditional formula (4) is met $$0.9<f3/(fw\cdot ft)^{1/2}<1.3 \tag{4}$$

where f3 is a focal length of the third lens group G3 and ft is a focal length of the entire lens system in the telescopic end condition, thus enabling further miniaturization to be made and enabling correction of coma aberration generating at the periphery of the image plane to be properly made.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 3 is a diagram showing spherical aberration, astigmatism, distortion, and coma aberration in an infinite distance focusing state of the wide-angle end condition;

FIG. 4 is a diagram showing spherical aberration, astigmatism, distortion, and coma aberration in the infinite distance focusing state in an intermediate focal length condition between the wide-angle end and the telescopic end;

FIG. 5 is a diagram showing spherical aberration, astigmatism, distortion, and coma aberration in the infinite distance focusing state in the telescopic end condition;

FIG. 7 is a diagram showing spherical aberration, astigmatism, distortion, and coma aberration in the infinite distance focusing state in the wide-angle end condition;

FIG. 8 is a diagram showing spherical aberration, astigmatism, distortion, and coma aberration in the infinite distance focusing state in the intermediate focal length condition between the wide-angle end and the telescopic end;

FIG. 9 is a diagram showing spherical aberration, astigmatism, distortion, and coma aberration in the infinite distance focusing state in the telescopic end condition;

FIG. 11 is a diagram showing spherical aberration, astigmatism, distortion, and coma aberration in the infinite distance focusing state in the wide-angle end condition;

FIG. 12 is a diagram showing spherical aberration, astigmatism, distortion, and coma aberration in the infinite distance focusing state in the intermediate focal length condition between the wide-angle end and the telescopic end;

FIG. 13 is a diagram showing spherical aberration, astigmatism, distortion, and coma aberration in the infinite distance focusing state in the telescopic end condition;

FIG. 15 is a diagram showing spherical aberration, astigmatism, distortion, and coma aberration in the infinite distance focusing state in the wide-angle end condition;

FIG. 16 is a diagram showing spherical aberration, astigmatism, distortion, and coma aberration in the infinite distance focusing state in the intermediate focal length condition between the wide-angle end and the telescopic end; and FIG. 17 is a diagram showing spherical aberration, astigmatism, distortion, and coma aberration in the infinite distance focusing state in the telescopic end condition.

DESCRIPTION OF THE EMBODIMENT

Figure 1:
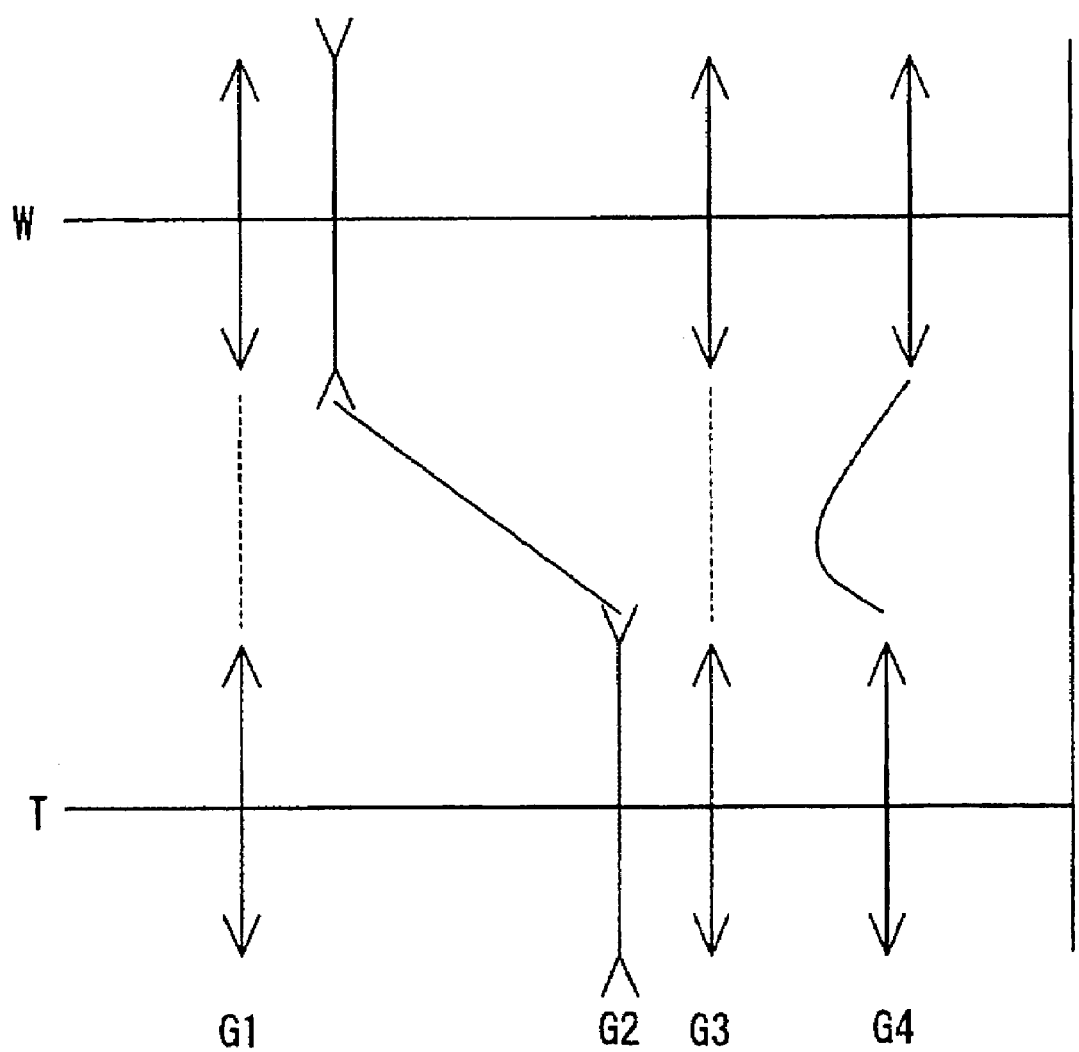
FIG. 1 is a diagram showing an arrangement of refraction of each lens group in a zoom lens according to the embodiment of the present invention.

Preferred embodiments of the present invention will be described below with reference to the accompanying drawings.

A zoom lens according to the embodiment of the present invention includes, like any conventional zoom lens, a first lens group G1 having positive refraction, a second lens group G2 having negative refraction, a third lens group G3 having positive refraction, and a fourth lens group G4 having positive refraction, each being arrayed in this order from an object side, wherein: when a magnification changes from a wide-angle end condition having the shortest focal length to a telescopic end condition having the longest focal length, the first lens group G1 and the third lens group G3 are fixed in predetermined positions relative to the optical axis direction; the second lens group G2 moves to the image side; and the fourth lens group G4 moves to compensate fluctuation of the position of the image plane which is generated following moving of the second lens group G2.

Based on the above-mentioned structure, according to the embodiment of the present invention, (I) the third lens group G3 includes a cemented lens and a positive lens arrayed in order from the object side, wherein the cemented lens includes the positive lens in which a convex surface thereof faces the object side and the negative lens in which a concave surface thereof faces the image side; and (II) an aperture stop is provided between the second lens group G2 and the third lens group G3 and is set in the optical axis direction as the lens positional status changes, thus enabling stable optical quality to be accomplished even at the time of manufacture.

A four-group zoom lens made up of four lens groups having each positive, negative, positive, and positive refraction being arrayed in order from the object side had conventional problems in that it had only one negative lens group, thus having a tendency to generate negative distortion-aberration in the wide-angle end condition and that the total lens length (length along the optical axis from the lens surface closest to the object side to the image surface in the lens system) became long. To solve this, by constituting the third lens group with the positive part of the group and the negative part of the group, negative distortion-aberration in the wide-angle end condition was properly corrected and the total lens length was shortened. However, since the positive part of the group and the negative part of the group are separate lenses in the third lens group, if the mutual decentering, however minute, should occur at the time of manufacture, there was a problem of deteriorating its optical performance considerably.

Accordingly, in the present invention, its structure is such that the cemented lens including a positive lens in which a convex surface thereof faces the object side and a negative lens in which a concave surface thereof faces the image side is provided closest to the object side of the third lens group G3, so that the lens surface of the object side of the positive lens functions as the positive part of the group and the lens surface of the image side of the negative lens functions as the negative part of the group.

Through construction in this manner, while it was conventionally necessary to incorporate (the positive part of the group and the negative part of the group) as separate elements in the lens barrel at the time of manufacture, incorporating (the cemented lens) as one element therein was made possible, thus enabling stable optical quality to be attained by suppressing the mutual decentering generated at the time of manufacture.

Incidentally, placement of an aperture stop in a zoom lens is important.

In the present invention, the aperture stop is arranged between the second lens group G2 and the third lens group G3, so that when the lens positional status changes from the wide-angle end condition to the telescopic end condition, a spacing between the first lens group G1 and the second lens group G2 increases, whereas a spacing between the second lens group G2 and the third lens group G3 decreases. This makes an off-axis flux of light passing through the first lens group G1 to move away from the optical axis, and, at the same time, makes another off-axis flux of light passing through the second lens group G2 to come near the optical axis, thereby properly correcting fluctuation of off-axis aberration which is generated when the lens positional status changes.

Further, when the lens positional status changes, the fourth lens group G4 moves in such a way as to vary a spacing between the fourth lens group G4 and the aperture stop, thereby properly correcting fluctuation of aberration outside the axis which generates when the lens positional status changes.

By configuring such that the third lens group G3 and the aperture stop are provided in close proximity to make the off-axis flux of light passing through the third lens group G3 to pass by the vicinity of the optical axis, the third lens group G3 properly corrects an axial aberration.

According to the embodiment of the present invention, it is preferable to meet the following conditional formula (1) so as to achieve further higher performance:

$$4<(R3a+R3b)/fw \cdot Fnow<7 \qquad (1)$$

where R3a is the radius of curvature of the lens surface, which is closest to the object side, of the third lens group G3, R3b is the radius of curvature of the lens surface, which is closest to the image side, of the third lens group G3, fw is the focal length of the entire lens system in the wide-angle end condition, and Fnow is the aperture ratio in the wide-angle end condition. The conditional formula (1) defines a shape of the cemented lens provided in the third lens group G3.

If the upper limit of the conditional formula (1) is exceeded, refraction of the lens surfaces on both sides of the cemented lens weakens, so that it becomes difficult to correct more properly negative distortion-aberration that is generated in the wide angle end condition. Conversely, if the lower limit of the conditional formula (1) is not reached, the off-axis flux of light passing through the lens surface on the image side of the cemented lens in the wide-angle end condition comes near the optical axis, so that it becomes impossible to correct more properly coma aberration that is generated in the periphery of the image plane.

It should be noted that in the conditional formula (1), the larger the aperture ratio in the wide angle end condition is, the wider the diameter of the flux of light becomes to make the negative spherical aberration easy to be generated. Consequently, the aperture ratio Fnow in the wide-angle end condition is used to multiply a sum (R3a+R3b) of the radius of curvature of two surfaces on the object side and on the image side of the cemented lens provided in the third lens group G3.

According to the embodiment of the present invention, it is desirable to set the lower limit of the conditional formula (1) at 4.5 to correct the negative spherical aberration more properly and to attain further higher performance. It is also desirable to set the upper limit of the conditional formula (1) at 6.7 to correct the negative spherical aberration that is generated in the wide-angle end condition more properly and to attain even higher performance.

Further, according to the embodiment of the present invention, in regard to the correction of the negative spherical aberration in the third lens group G3, it is preferable to meet the following conditional formula (2)

$$1.1<D3a/fw \qquad (2)$$

where D3a is a center thickness of the cemented lens provided in the third lens group. The conditional formula (2) defines a ratio of the center thickness of the cemented lens in the third lens group G3.

In the event that the lower limit of the conditional formula (2) is not reached, refraction on the lens surface on the object side of the cemented lens becomes so strong on the positive side that the flux of light is refracted intensively, thus making it impossible to correct the negative spherical aberration properly.

According to the embodiment of the present invention, by placing the positive lens closest to the image side of the third lens group G3 and setting up to make the lens surface on the image side of the positive lens in which a convex surface thereof faces to the image side, it is designed to suppress performance deterioration due to the mutual decentering generating between the third lens group G3 and the fourth lens group G4.

To correct the negative distortion-aberration that is generated in the wide angle end condition, conventionally, the lens surface, which is closest to the image side, of the third lens group G3 was often set so that a concave surface thereof faces the image side. Especially, as a result of an attempt to achieve a balance between miniaturization and high performance, the curvature of the concave face increased to diverge intensively the off-axis flux of light. Since this diverging action of the concave face went counter to the converging action of the fourth lens group G4, there was considerable performance deterioration due to the mutual decentering.

Now, according to the embodiment of the present invention, by configuring such that the lens surface on the image side of the positive lens, which is closest to the image side, of the third lens group G3 is set so that a convex surface thereof faces to the image side, the diverging action given to the axial flux of light emitting from the third lens group G3 is weakened, thereby suppressing performance deterioration due to the mutual decentering of the third lens group G3 and the fourth lens group G4.

Further, it is preferable for a zoom lens according to the embodiment of the present invention to meet the following conditional formula (3):

$$1<|R3b|/Db<10 \qquad (3)$$

where R3b is a radius of curvature of the lens surface, which is closest to the image side, of the third lens group G3, and Db is a spacing on the axis from the aperture stop to the lens surface, which is closest to the image side, of the third lens group G3. The conditional formula (3) is a conditional formula defining a shape of the lens surface of the third lens group G3 closest to the image side.

If the lower limit of the conditional formula (3) is not reached, because the off-axis flux of light passes through the lens surface closest to the image side away from the optical axis, a large quantity of coma aberration is generated in the periphery of the image plane.

Conversely, If the upper limit of the conditional formula (3) is exceeded, because the off-axis flux of light emitting from the third lens group G3 diverges intensively, performance deterioration due to the mutual decentering of the third lens group G3 and the fourth lens group G4 increases.

Further, it is preferable for a zoom lens according to the embodiment of the present invention to meet the following conditional formula (4):

$$0.9<f3/(fw \cdot ft)^{1/2}<1.3 \qquad (4)$$

where f3 is a focal length of the third lens group G3 and ft is a focal length of the entire lens system in the telescopic end condition. The conditional formula (4) is a conditional formula defining the focal length of the third lens group G3.

If the lower limit of the conditional formula (4) is not reached, the amount of movement of the fourth lens group G4 necessary when varying the magnification rises so that widening a spacing between the third lens group G3 and the fourth lens group G4 is necessitated, making it impossible to attain further miniaturization.

Conversely, if the upper limit of the conditional formula (4) is exceeded, because the off-axis flux of light intensively converged by the fourth lens group G4, coma aberration that is generated in the periphery of the image plane cannot be corrected more properly and higher performance cannot be attained.

According to the embodiment of the present invention, as mentioned above, through devising the way to construct the third lens group G3, it was made possible to suppress performance deterioration due to the decentering between lenses in the third lens group G3. To realize stable optical quality at the time of manufacture, it is desirable to construct such that, outside the range in which the effective flux of light passes, the cemented lens constituting the third lens group G3 and the positive lens provided on its image side come into direct abutment with each other.

It should be noted that the effective flux of light indicates a flux of light issuing from an object is limited by an aperture stop, a flare diaphragm, an outer diameter of a lens and the like, reaching the effective image plane.

Further, according to the embodiment of the present invention, since the lens surface on the image side of the negative lens, which is constituting the cemented lens, in which a concave surface thereof faces the image side, it is desirable to put the cemented lens and the positive lens inside the lens barrel, as a shape of the lens periphery Lm (refer to FIG. 2, FIG. 6, FIG. 10, and FIG. 14) being cut, in a manner of pushing the positive lens from behind. By configuring in this manner, the lens surface on the image side of the negative lens and the lens surface on the object side of the positive lens which constitute the cemented lens come in contact with the periphery LM, hence, it becomes possible to suppress the decentering between the two lenses, thus enabling stable optical quality to be realized at the time of manufacture.

It should be noted that, according to the embodiment of the present invention, the use of an aspherical lens may realize higher optical performance. Especially, by making the lens surface, which is closest to the object side, of the third lens group G3 an aspherical lens, it is possible to endow central performance with higher performance. Further, by using an aspherical lens for the second lens group G2, it is possible to correct properly fluctuation of coma aberration, due to an angle of view, generated in the wide-angle end condition. By using an aspherical lens for the fourth lens group G4, it is possible to correct more properly fluctuation of coma aberration due to an angle of view in the telescopic end condition.

Further, for obtaining higher performance, it is desirable to use preferably a plurality of aspherical surfaces in one optical system.

According to the embodiment of the present invention, by shifting one lens group or part of one lens group among the lens groups constituting the lens system in an approximately perpendicular direction to the optical axis, it is possible to shift the image, whereas by combining a detection system that detects an unintentional vibration of a camera resulting from a user's hands, a drive system that shifts the above-mentioned lens group, and a control system that gives the amount of shift to the drive system following an output of the detection system, it is possible to make the system function as an anti-vibration optical system.

Especially, according to the embodiment of the present invention, by shifting part of the third lens group G3 or all of it in an approximately perpendicular direction to the optical axis, it is possible to shift the image with small fluctuation of aberration. As the third lens group G3 is provided in the vicinity of the aperture stop, the off-axis flux of light passes in the vicinity of the optical axis, and this is because of small fluctuation of coma aberration that is generated when the shift is made. It should be noted that in the present invention, it is preferable to move one lens group of the lens groups constituting the lens system at the time of focusing over a short distance, or to move part of the lens group of one lens group. Especially, since the fourth lens group G4 has a small lens diameter, a short distance focusing can be performed with a small amount of work (=weight ×amount of movement)and it is preferable to move the fourth lens group G4.

Furthermore, it is naturally possible to place a low-pass filter on the image side of the lens system to prevent moire fringes from being generated or to place an infra-red ray cut filter corresponding to spectral response characteristics of the light-receiving element.

A zoom lens according to the embodiment of the present invention is also applicable to a vari-focal zoom lens in which a focal length condition does not exist consecutively.

Each Example of a zoom lens according to the embodiment of the present invention will be described below. In each Example, the aspherical surface is expressed by the following (Math 1) formula.

$$x=cy^2/(1+(1-(1+k)c^2y^2)^{1/2})+C_4y^4+C_6y^6+ \quad (\text{Math1})$$

where x is an amount of sag, c is curvature, k is a conic constant, and $C_4, C_6, \ldots$ are aspherical surface coefficients.

FIG. 1 shows a distribution of refraction of each lens group of a focal length lens system in each Example of a zoom lens according to the embodiment of the present invention. Namely, longitudinal lines whose arrows on both ends (up and down) point at opposite directions indicate positions of the lens groups having positive refraction, while longitudinal lines whose arrows on both ends (up and down) point at each other indicate positions of the lens groups having negative refraction. And a transverse line shown by W indicates a position of each lens group in the wide-angle end condition, while a transverse line shown by T indicates a position of each lens group in the telescopic end condition. Also, broken lines between the transverse line W and the transverse line T show that the position is fixed when varying the magnification, and solid lines indicate positions of movement.

A zoom lens according to the embodiment of the present invention includes the first lens group G1 having positive refraction, the second lens group G2 having negative refraction, the third lens group G3 having positive refraction, and the fourth lens group G4 having positive fraction, each being arrayed in order from the object side, wherein: the second lens group moves to the image side so that when the magnification is varied from the wide-angle end condition to the telescopic end condition, the air space between the first lens group G1 and the second lens group G2 increases and the air space between the second lens group G2 and the third lens group G3 decreases. At this time, the first lens group G1 and the third lens group G3 are fixed, while the fourth lens group G4 moves so as to correct fluctuation of the image surface position following the movement of the second lens group.

It should be noted that in each Example, a protective glass LPF is provided closest to the image side.

EXAMPLE 1

Figure 2:
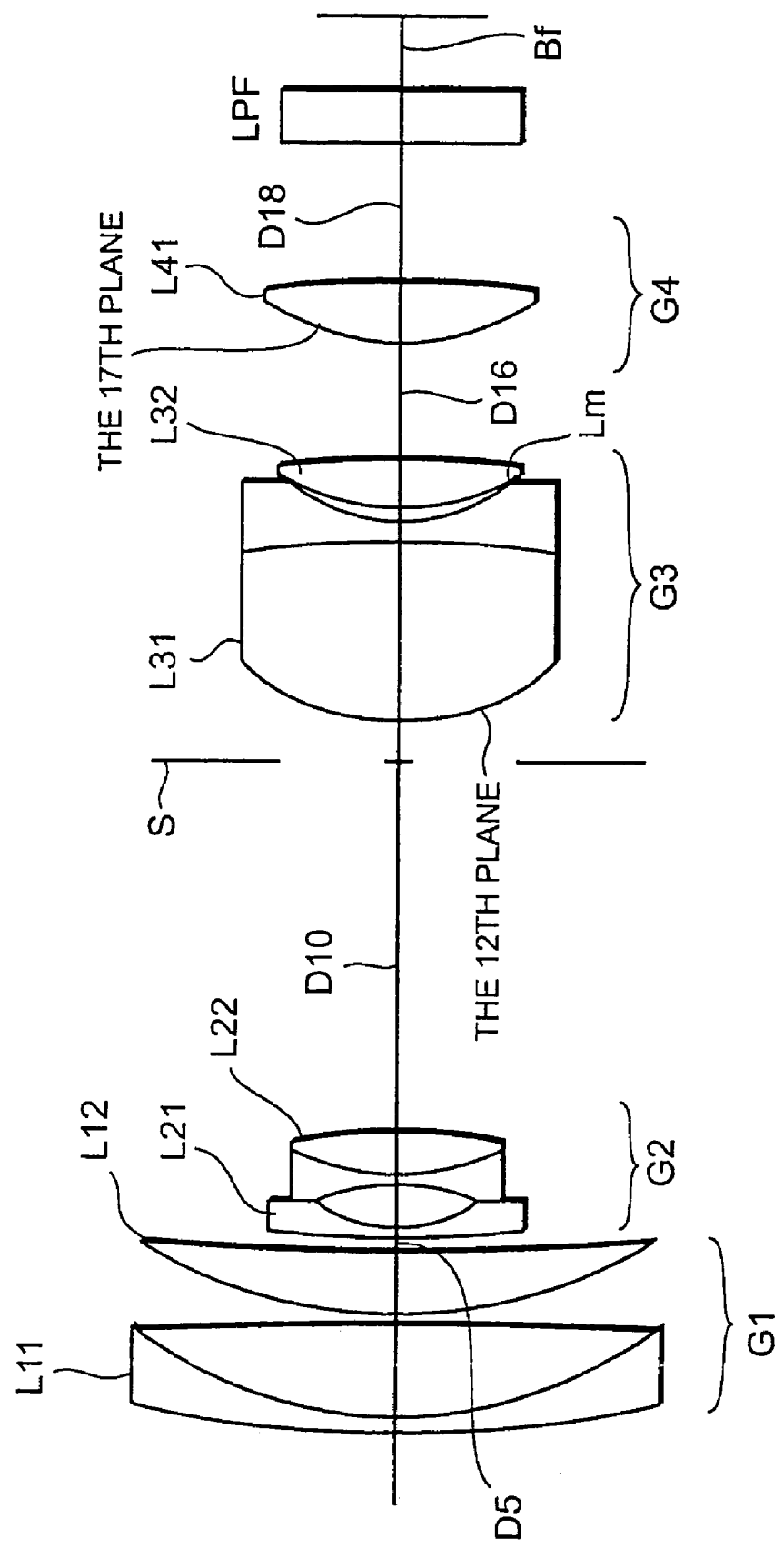
FIG. 2 shows, together with FIG. 3 to FIG. 5, Example 1 of a zoom lens according to the embodiment of the present invention, and this diagram shows a lens structure.

FIG. 2 is a diagram showing a lens structure of a zoom lens according to Example 1 of the present invention. The first lens group G1 includes a cemented lens L11 including a negative lens of a meniscus shape in which a convex surface thereof faces the object side and a positive lens in which a convex surface faces the object side and a positive lens L12 in which a convex surface thereof faces the object side; the second lens group G2 includes a negative lens L21 in which a concave surface thereof faces the image side and a cemented lens L22 including a biconcave negative lens and a positive lens in which a convex surface thereof faces the object side; the third lens group G3 includes a cemented lens L31 including a positive lens in which a convex surface thereof faces the object side and a negative lens in which a concave surface thereof faces the image side, and a positive lens L32 in which a convex surface thereof faces the object side; and the fourth lens group G4 includes a positive lens L41 in which a convex surface thereof faces the object side.

In Example 1, the aperture stop S is provided between the second lens group G2 and the third lens group G3, and the position is fixed when the lens positional status changes.

Table 1 below lists the values of specifications of a zoom lens according to Example 1 of the present invention. In Table 1, f is a focal length of the entire lens system, FNO is F number, 2ω is an angle of view, and refractive index is a value relative to d line (λ=587.6 mm). Note that a radius of curvature 0 in Table 1 indicates a plane.

TABLE 1

| f | 1.00~4.09~9.10 |
| FNO | 1.85~2.12~2.71 |
| 2ω | 63.78~15.04~6.63° |

| Plane No. | Radius of Curvature | Spacing of Planes | Refractive Index | Abbe No. | |
|---|---|---|---|---|---|
| 1: | 11.5708 | 0.145 | 1.84666 | 23.8 | |
| 2: | 3.5732 | 0.636 | 1.65160 | 58.4 | |
| 3: | −70.9054 | 0.036 | | | |
| 4: | 3.8962 | 0.458 | 1.88300 | 40.8 | |
| 5: | 18.9049 | (D5) | | | |
| 6: | 18.9049 | 0.073 | 1.88300 | 40.8 | |
| 7: | 1.4342 | 0.315 | | | |
| 8: | −1.5150 | 0.073 | 1.83500 | 43.0 | |
| 9: | 1.9086 | 0.315 | 1.92286 | 20.9 | |
| 10: | −5.7958 | (D10) | | | |
| 11: | 0.0000 | 0.364 | | | (aperture stop) |
| 12: | 1.6403 | 1.364 | 1.80610 | 40.7 | |
| 13: | −18.1133 | 0.185 | 1.84666 | 23.8 | |
| 14: | 1.3301 | 0.091 | | | |
| 15: | 1.7547 | 0.367 | 1.48749 | 70.4 | |
| 16: | −8.9227 | (D16) | | | |
| 17: | 1.6700 | 0.467 | 1.48749 | 70.4 | |
| 18: | −6.6899 | (D18) | | | |
| 19: | 0.0000 | 0.374 | 1.55671 | 58.6 | (protective glass) |
| 20: | 0.0000 | (Bf) | | | |

The 12th and 17th planes of a zoom lens according to Example 1 are aspherical, and the aspherical coefficients of these planes are as shown in Table 2.

TABLE 2

[12th Plane]

$\kappa = -1.082736$  $C_4 = +0.123738 \times 10^{-1}$  $C_6 = +0.175719 \times 10^{-2}$
$C_8 = +0.361262 \times 10^{-3}$

[17th Plane]

$\kappa = +0.220865$  $C_4 = -0.410063 \times 10^{-1}$  $C_6 = -0.991149 \times 10^{-2}$
$C_8 = +0.374162 \times 10^{-2}$ In Example 1, when the lens positional status changes, changes occur in an on-axis surface space D5 between the first lens group G1 and the second lens group G2, an on-axis surface space D10 between the second lens group G2 and the aperture stop S, an on-axis surface space D16 between the third lens group G3 and the fourth lens group G4, and an on-axis surface space D18 between the fourth lens group G4 and a protective glass LPF. The values in each condition of these variable spacings of planes D5, D10, D16, and D18 in the wide-angle end condition (F.L.=1.000), the telescopic end condition (F.L.=9.100), and the intermediate focal length condition (F.L.=4.091) midway between the wide-angle end condition and the telescopic end condition, are shown in Table 3 below. Note that "F.L." stands for a focal length in the infinite distance focusing state.

TABLE 3

| F.L. | 1.000 | 4.091 | 9.100 |
|---|---|---|---|
| D5 | 0.145 | 2.155 | 2.941 |
| D10 | 2.942 | 0.932 | 0.145 |
| D16 | 0.928 | 0.218 | 1.100 |
| D18 | 1.067 | 1.777 | 0.895 |
| Bf | 0.567 | 0.567 | 0.567 |

Each value of the above-mentioned conditional formulas (1) to (4) and the focal length f3 of the third lens group G3 of a zoom lens in Example 1 are shown in Table 4.

TABLE 4

| | f3 = +3.2633 |
|---|---|
| (1) | (R3a + R3b)/fw · Fnow = 5.495 |
| (2) | D3a/fw = 1.549 |
| (3) | |R3b|/Db = 3.619 |
| (4) | f3/(fw · ft)$^{1/2}$ = 1.082 |

FIG. 3 to FIG. 5 show respectively diagrams of various aberrations in the infinite distance focusing state of a zoom lens according to Example 1 of the present invention. FIG. 3 shows diagrams of various aberrations in the wide-angle end condition (f=1.000), FIG. 4 shows diagrams of various aberrations in the intermediate focal length condition (f=4.091), and FIG. 5 shows diagrams of various aberrations in the telescopic end condition (f=9.100).

In each of these diagrams of various aberrations, solid lines in the spherical aberration diagram indicate spherical aberration, dotted lines indicate a sign condition, y indicates an image height, solid lines in the diagram of astigmatism indicate a sagittal image surface, and broken lines indicate a meridional image surface. The diagrams of coma aberration show coma aberration at image heights y=0, 0.269, 0.377, and 0.539, while A respectively shows an angle of view.

It is apparent from each diagram of aberration that various aberration is properly corrected in a zoom lens according to Example 1, having excellent image-forming performance.

EXAMPLE 2

Figure 6:
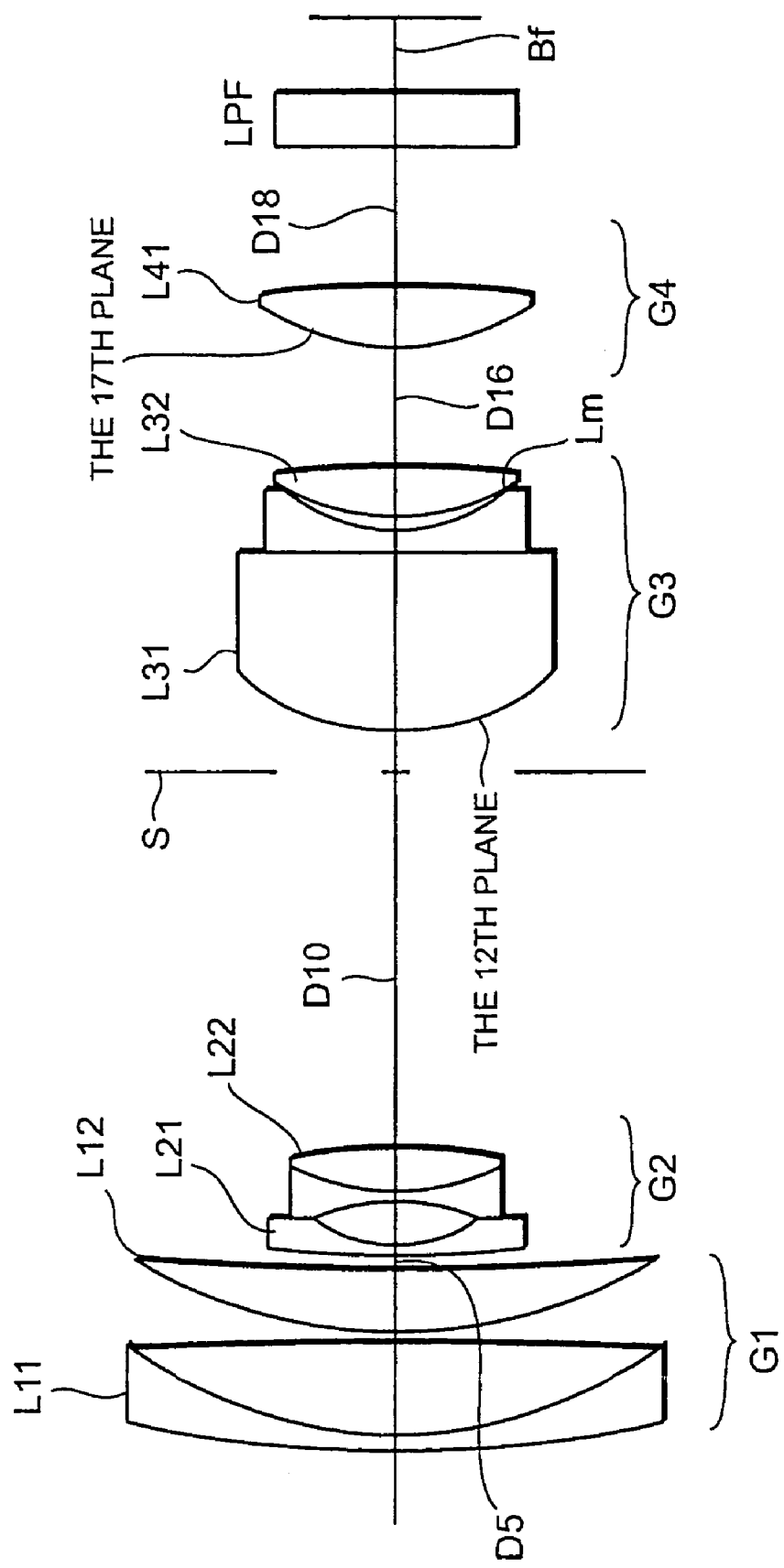
FIG. 6 shows, together with FIG. 7 to FIG. 9, Example 2 of a zoom lens according to the present invention, and this diagram shows a lens structure.

FIG. 6 is a diagram showing a lens structure of a zoom lens according to Example 2 according the present invention: the first lens group G1 includes a cemented lens L11 including a negative lens of a meniscus shape in which a convex surface thereof faces the object side and a positive lens in which a convex surface thereof faces the object side, and a positive lens L12 in which a convex surface thereof faces the object side; the second lens group G2 includes a negative lens L21 in which a concave surface thereof faces the image side and a cemented lens L22 including a biconcave negative lens and a positive lens in which a convex surface thereof faces the object side; the third lens group G3 includes a cemented lens L31 including a positive lens in which a convex surface thereof faces the object side and a negative lens in which a concave surface thereof faces the image side, and a positive lens L32 in which a convex surface thereof faces the object side; and the fourth lens group G4 includes a positive lens L41 in which a convex surface thereof faces the object side.

In Example 2, the aperture stop S is provided in between the second lens group G2 and the third lens group G3 and is fixed when the lens positional status changes.

Table 5 below lists the values of specifications of a zoom lens according to Example 2 according the present invention. In Table 5, f is a focal length, FNO is F number, 2ω is an angle of view, and a refractive index is a value relative to d line (λ=587.6 mm). Note that the radius of curvature 0 in Table 5 indicates a plane.

TABLE 5

| | f | 1.00~4.09~9.10 |
| | FNO | 1.85~2.18~2.90 |
| | 2ω | 66.42~15.80~6.67° |

| Plane No. | Radius of Curvature | Spacing of Planes | Refractive Index | Abbe No. | |
|---|---|---|---|---|---|
| 1: | 9.8578 | 0.145 | 1.92286 | 20.9 | |
| 2: | 3.9941 | 0.536 | 1.75500 | 52.3 | |
| 3: | 104.0376 | 0.036 | | | |
| 4: | 4.0910 | 0.411 | 1.88300 | 40.8 | |
| 5: | 15.0472 | (D5) | | | |
| 6: | 15.0472 | 0.073 | 1.88300 | 40.8 | |
| 7: | 1.4333 | 0.315 | | | |
| 8: | −1.4974 | 0.073 | 1.83500 | 43.0 | |
| 9: | 1.8748 | 0.304 | 1.92286 | 20.9 | |
| 10: | −5.5186 | (D10) | | | |
| 11: | 0.0000 | 0.364 | | | (aperture stop) |
| 12: | 1.6731 | 1.273 | 1.80610 | 40.7 | |
| 13: | 0.0000 | 0.158 | 1.84666 | 23.8 | |
| 14: | 1.4057 | 0.091 | | | |
| 15: | 1.9999 | 0.340 | 1.49700 | 81.5 | |
| 16: | −10.1546 | (D16) | | | |
| 17: | 1.7656 | 0.551 | 1.48749 | 70.4 | |
| 18: | −5.3089 | (D18) | | | |
| 19: | 0.0000 | 0.373 | 1.55671 | 58.6 | (protective glass) |
| 20: | 0.0000 | (Bf) | | | |

The 12th and 17th planes of a zoom lens according to Example 2 are aspherical, and the aspherical coefficients of these planes are as shown in Table 6.

TABLE 6

[12th Plane]
κ = −1.082736   $C_4 = +0.123738 \times 10^{-1}$   $C_6 = +0.175719 \times 10^{-2}$
$C_8 = +0.361262 \times 10^{-3}$

[17th Plane]
κ = +0.220865   $C_4 = -0.410063 \times 10^{-1}$   $C_6 = -0.991149 \times 10^{-2}$
$C_8 = +0.374162 \times 10^{-2}$ In a zoom lens according to Example 2, when the lens positional status changes, changes occur in the on-axis surface space D5 between the first lens group G1 and the second lens group G2, the on-axis surface space D10 between the first lens group G1 and the aperture stop S, the on-axis surface space D16 between the third lens group G3 and the fourth lens group G4, and the on-axis surface space D18 between the fourth lens group G4 and a protective glass LPF. The values in each state of these variable spacings of planes D5, D10, D16, and D18 in the wide-angle end condition (F.L.=1.000), the telescopic end condition (F.L.=9.100), and the intermediate focal length condition (F.L.=4.091) midway between the wide-angle end condition and the telescopic end condition, are shown in Table 7 below. Note that "F.L." stands for the focal length in the infinite distance focusing state.

TABLE 7

| F.L. | 1.000 | 4.091 | 9.100 |
|---|---|---|---|
| D5 | 0.145 | 2.199 | 3.026 |
| D10 | 3.026 | 0.973 | 0.145 |
| D16 | 0.984 | 0.257 | 1.085 |
| D18 | 1.126 | 1.853 | 1.026 |
| Bf | 0.567 | 0.567 | 0.567 |

Each value of the above-mentioned conditional formulas (1) to (4) and the focal length f3 of the third lens group G3 of a zoom lens in Example 2 are shown in Table 8.

TABLE 8 f3 = +3.4818

| (1) | (R3a + R3b)/fw · Fnow = 5.700 |
| (2) | D3a/fw = 1.431 |
| (3) | |R3b|/Db = 5.410 |
| (4) | f3/(fw · ft)$^{1/2}$ = 1.154 |

FIG. 7 to FIG. 9 show respectively diagrams of various aberrations in the infinite distance focusing state of a zoom lens according to Example 2 of the present invention. FIG. 7 shows diagrams of various aberrations in the wide-angle end condition (f=1.000), FIG. 8 shows diagrams of various aberrations in the intermediate focal length condition (f=4.091), and FIG. 9 shows diagrams of various aberrations in the telescopic end condition (f=9.100).

In each of these diagrams of various aberrations, solid lines in the spherical aberration diagram indicate spherical aberration, dotted lines indicate a sign condition, y indicates an image height, solid lines in the diagram of astigmatism indicate a sagittal image surface, and broken lines indicate a meridional image surface. The diagrams of coma aberration show coma aberration at image heights y=0, 0.269, 0.377, and 0.539, while A respectively shows an angle of view.

It is apparent from each diagram of aberration that various aberration is properly corrected in a zoom lens according to Example 2, having excellent image-forming performance.

EXAMPLE 3

Figure 10:
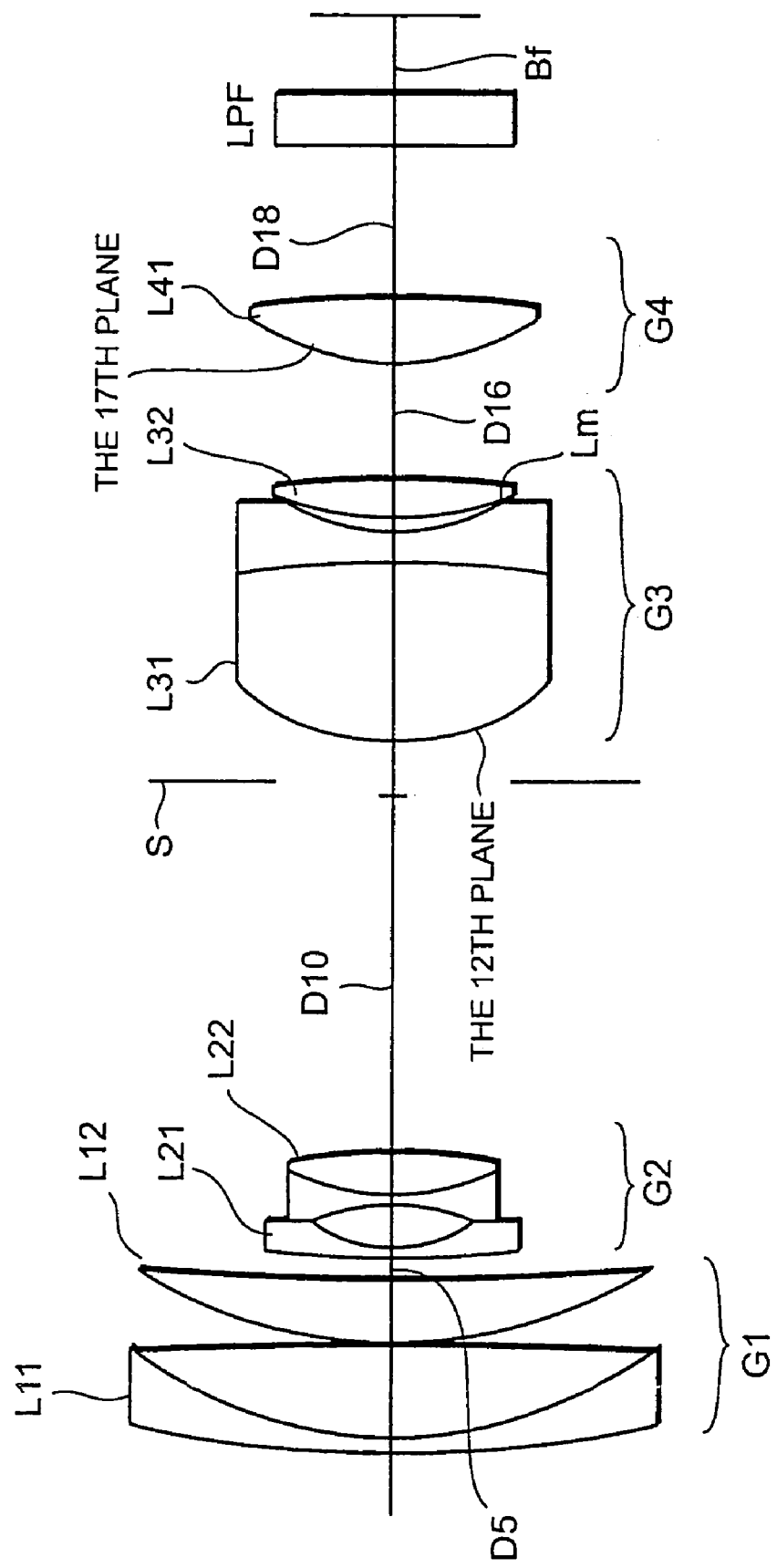
FIG. 10 shows, together with FIG. 11 to FIG. 13, Example 3 of a zoom lens according to the present invention, and this diagram shows a lens structure.

FIG. 10 is a diagram showing a lens structure of a zoom lens according to Example 3 of the present invention: the first lens group G1 includes a cemented lens L11 including a negative lens of a meniscus shape in which a convex surface thereof faces the object side and a positive lens in which a concave surface thereof faces the object side, and a positive lens L12 in which a convex surface thereof faces the object side; the second lens group G2 includes a negative lens L21 in which a concave surface thereof faces the image side and a cemented lens L22 including a biconcave negative lens and a positive lens in which a convex surface thereof faces the object side; the third lens group G3 includes a cemented lens L31 including a positive lens in which a convex surface thereof faces the object side and a negative lens in which a concave surface thereof faces the image side, and a positive lens L32 in which a convex surface thereof faces the object side; and the fourth lens group G4 includes a positive lens L41 in which a convex surface thereof faces the object side.

In Example 3, the aperture stop S is provided in between the second lens group G2 and the third lens group G3 and is fixed when the lens positional status changes.

Table 9 below lists the values of specifications of a zoom lens according to Example 3 of the present invention. In Table 9, f is a focal length, FNO is F number, 2ω is an angle of view, and a refractive index is a value relative to d line (λ=587.6 nm). Note that the radius of curvature 0 in Table 9 indicates a plane.

TABLE 9

| | f | 1.00~4.09~9.10 |
| | FNO | 1.85~2.15~2.90 |
| | 2ω | 66.32~15.38~6.65° |

| Plane No. | Radius of Curvature | Spacing of Planes | Refractive Index | Abbe No. | |
|---|---|---|---|---|---|
| 1: | 9.8393 | 0.145 | 1.92286 | 20.9 | |
| 2: | 3.9683 | 0.540 | 1.75500 | 52.3 | |
| 3: | 193.0266 | 0.036 | | | |
| 4: | 4.0734 | 0.371 | 1.88300 | 40.8 | |
| 5: | 15.2897 | (D5) | | | |
| 6: | 15.2897 | 0.073 | 1.88300 | 40.8 | |
| 7: | 1.4562 | 0.313 | | | |
| 8: | −1.5568 | 0.073 | 1.83500 | 43.0 | |
| 9: | 1.8963 | 0.300 | 1.92286 | 20.9 | |
| 10: | −6.2812 | (D10) | | | |
| 11: | 0.0000 | 0.364 | | | (aperture stop) |
| 12: | 1.6675 | 1.273 | 1.73077 | 40.5 | |
| 13: | −8.9577 | 0.422 | 1.84666 | 23.8 | |
| 14: | 1.5995 | 0.091 | | | |
| 15: | 2.5491 | 0.333 | 1.48749 | 70.4 | |
| 16: | −4.6689 | (D16) | | | |
| 17: | 1.6582 | 0.509 | 1.48749 | 70.4 | |
| 18: | −6.6035 | 1.148 | | | |
| 19: | 0.0000 | 0.373 | 1.55671 | 58.6 | (protective glass) |
| 20: | 0.0000 | (Bf) | | | |

Each lens surface of the 12th and 17$^{th}$ planes of a zoom lens according to Example 3 is aspherical, and the aspherical coefficients are as shown in Table 10.

TABLE 10

[12$^{th}$ Plane]

$\kappa = -1.05192$  $C_4 = +0.935283 \times 10^{-2}$  $C_6 = -0.773237 \times 10^{-3}$
$C_8 = +0.174942 \times 10^{-2}$

[17$^{th}$ Plane]

$\kappa = 1.04383$  $C_4 = -0.167729 \times 10^{-2}$  $C_6 = +0.498549 \times 10^{-3}$
$C_8 = +0.121782 \times 10^{-2}$ In a zoom lens according to Example 3, when the lens positional status changes, changes occur in the on-axis surface space D5 between the first lens group G1 and the second lens group G2, the on-axis surface space D10 between the first lens group G1 and the aperture stop S, the on-axis surface space D16 between the third lens group G3 and the fourth lens group G4, and the on-axis surface space D18 between the fourth lens group G4 and a protective glass LPF. The values in each state of these variable spacings of planes D5, D10, D16, and D18 in the wide-angle end condition (F.L.=1.000), the telescopic end condition (F.L.=9.100), and the intermediate focal length condition (F.L.=4.091) midway between the wide-angle end condition and the telescopic end condition, are shown in Table 11 below. Note that "F.L." stands for the focal length in the infinite distance focusing state.

TABLE 11

| F.L. | 1.000 | 4.091 | 9.100 |
|---|---|---|---|
| D5 | 0.145 | 2.180 | 2.968 |
| D10 | 2.968 | 0.933 | 0.145 |
| D16 | 0.868 | 0.219 | 1.114 |
| D18 | 1.148 | 1.796 | 0.901 |
| Bf | 0.567 | 0.567 | 0.567 |

Each value of the above-mentioned conditional formulas (1) to (4) and the focal length f3 of the third lens group G3 of a zoom lens in Example 3 are shown in Table 12.

TABLE 12 f3 = +3.5039

| (1) | (R3a + R3b)/fw · Fnow = 6.044 |
| (2) | D3a/fw = 1.695 |
| (3) | |R3b|/Db = 1.881 |
| (4) | f3/(fw · ft)$^{1/2}$ = 1.162 |

FIG. 11 to FIG. 13 show respectively diagrams of various aberrations in the infinite distance focusing state of a zoom lens according to Example 3 of the present invention. FIG. 11 shows diagrams of various aberrations in the wide-angle end condition (f=1.000), FIG. 12 shows diagrams of various aberrations in the intermediate focal length condition (f=4.091), and FIG. 13 shows diagrams of various aberrations in the telescopic end condition (f=9.100).

In each of these diagrams of various aberrations, solid lines in the spherical aberration diagram indicate spherical aberration, dotted lines indicate a sign condition, y indicates an image height, solid lines in the diagram of astigmatism indicate a sagittal image surface, and broken lines indicate a meridional image surface. The diagrams of coma aberration show coma aberration at image heights y=0, 0.269, 0.377, and 0.539, while A respectively shows an angle of view.

It is apparent from each diagram of aberration that various aberration is properly corrected in a zoom lens according to Example 3, having excellent image-forming performance.

EXAMPLE 4

Figure 14:
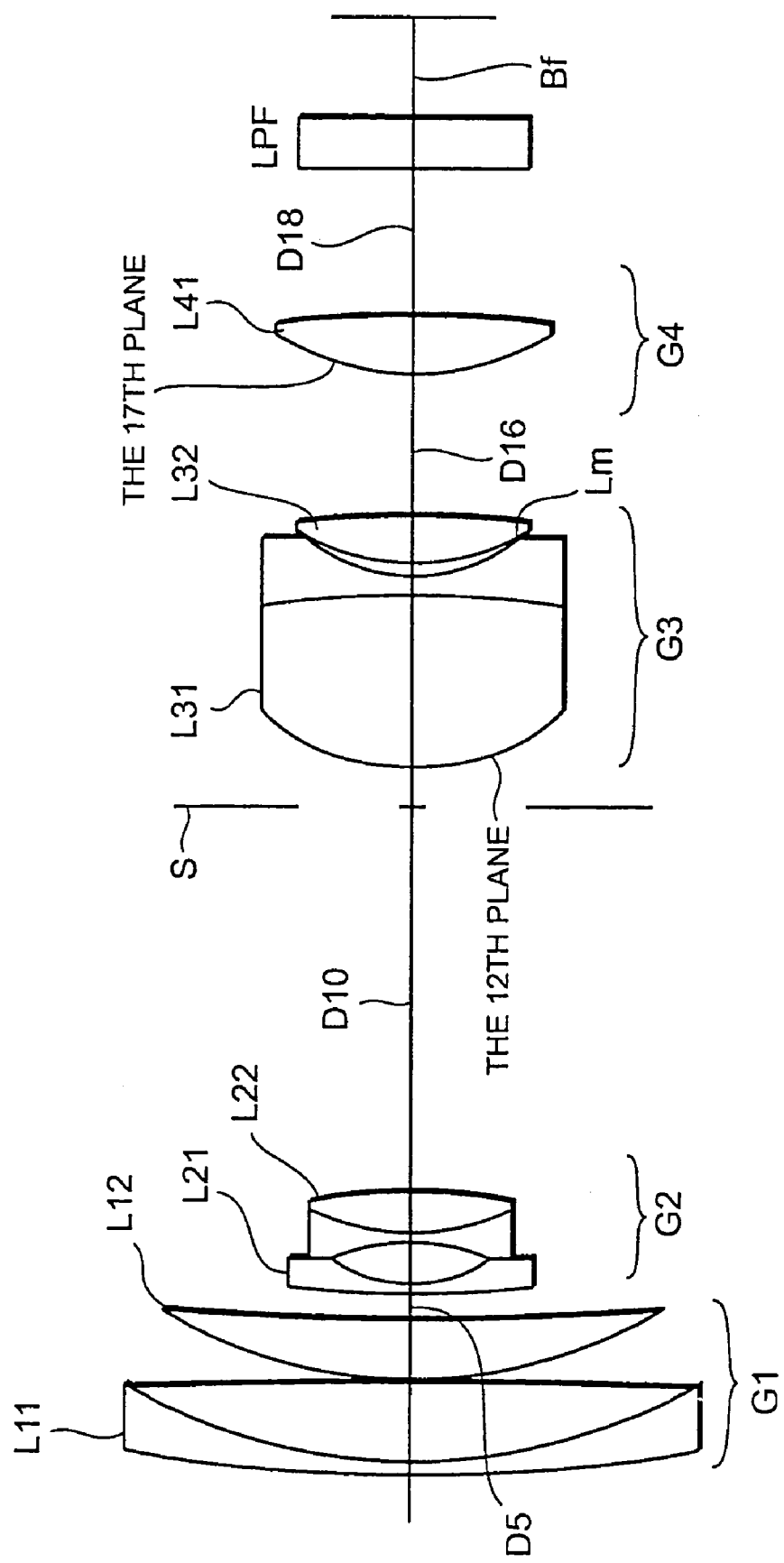
FIG. 14 shows, together with FIG. 15 to FIG. 17, Example 4 of a zoom lens according to the present invention, and this diagram shows a lens structure.

FIG. 14 is a diagram showing a lens structure of a zoom lens according to Example 3 of the present invention: the first lens group G1 includes a cemented lens L11 including a negative lens of a meniscus shape in which a convex surface thereof faces the object side and a positive lens in which a concave surface thereof faces the object side, and a positive lens L12 in which a convex surface thereof faces the object side; the second lens group G2 includes a negative lens L21 in which a concave surface thereof faces the image side and a cemented lens L22 including a biconcave negative lens and a positive lens in which a convex surface thereof faces the object side; the third lens group G3 includes a cemented lens L31 including a positive lens in which a convex surface thereof faces the object side and a negative lens in which a concave surface thereof faces the image side, and a positive lens L32 in which a convex surface thereof faces the object side; and the fourth lens group G4 includes a positive lens L41 in which a convex surface thereof faces the object side.

In Example 4, the aperture stop S is provided in between the second lens group G2 and the third lens group G3 and is fixed when the lens positional status changes.

Table 13 below lists the values of specifications of a zoom lens according to Example 4 of the present invention. In Table 13, f is a focal length, FNO is F number, 2ω is an angle of view, and a refractive index is a value relative to d line (λ=587.6 nm). Note that the radius of curvature 0 in Table 13 indicates a plane.

TABLE 13

| f | 1.00~4.09~9.10 |
| FNO | 1.85~2.15~2.71 |
| 2ω | 65.72~15.01~6.65° |

| Plane No. | Radius of Curvature | Spacing of Planes | Refractive Index | Abbe No. | |
|---|---|---|---|---|---|
| 1: | 10.3075 | 0.145 | 1.92286 | 20.9 | |
| 2: | 4.0794 | 0.545 | 1.69680 | 55.5 | |
| 3: | −72.8238 | 0.036 | | | |
| 4: | 3.9157 | 0.376 | 1.88300 | 40.8 | |
| 5: | 15.2199 | (D5) | | | |
| 6: | 15.2199 | 0.073 | 1.88300 | 40.8 | |
| 7: | 1.4668 | 0.305 | | | |
| 8: | −1.5816 | 0.073 | 1.80420 | 46.5 | |
| 9: | 1.4531 | 0.320 | 1.84666 | 23.8 | |
| 10: | −7.3405 | (D10) | | | |
| 11: | 0.0000 | 0.364 | | | (aperture stop) |
| 12: | 1.5139 | 1.273 | 1.68893 | 31.2 | |
| 13: | −6.5615 | 0.273 | 1.92286 | 20.9 | |
| 14: | 1.6000 | 0.120 | | | |
| 15: | 2.9631 | 0.331 | 1.62041 | 60.3 | |
| 16: | −4.6916 | (D16) | | | |
| 17: | 1.7076 | 0.509 | 1.48749 | 70.4 | |
| 18: | −6.6938 | (D18) | | | |
| 19: | 0.0000 | 0.373 | 1.55671 | 58.6 | (protective glass) |
| 20: | 0.0000 | (Bf) | | | |

Each lens surface of the 12th and 17$^{th}$ planes of a zoom lens according to Example 3 is aspherical, and the aspherical coefficients are as shown in Table 14.

TABLE 14

[12$^{th}$ Plane]

$\kappa = -0.13486$   $C_4 = -0.180352 \times 10^{-1}$   $C_6 = -0.54577 \times 10^{-2}$
$C_8 = 0$

[17$^{th}$ Plane]

$\kappa = +0.21158$   $C_4 = -0.339311 \times 10^{-1}$   $C_6 = -0.406139 \times 10^{-2}$
$C_8 = +0.23976 \times 10^{-2}$ In a zoom lens according to Example 4, when the lens positional status changes, changes occur in the on-axis surface space D5 between the first lens group G1 and the second lens group G2, the on-axis surface space D10 between the first lens group G1 and the aperture stop S, the on-axis surface space D16 between the third lens group G3 and the fourth lens group G4, and the on-axis plane spacing D18 between the fourth lens group G4 and a protective glass LPF. The values in each state of these variable spacings of planes D5, D10, D16, and D18 in the wide-angle end condition (F.L.=1.000), the telescopic end condition (F.L.=9.100), and the intermediate focal length condition (F.L.=4.091) midway between the wide-angle end condition and the telescopic end condition, are shown in Table 15 below. Note that "F.L." stands for the focal length in the infinite distance focusing state.

TABLE 15

| F.L. | 1.000 | 4.091 | 9.100 |
|---|---|---|---|
| D5 | 0.145 | 2.129 | 2.900 |
| D10 | 2.900 | 0.919 | 0.145 |
| D16 | 0.926 | 0.255 | 1.171 |
| D18 | 1.092 | 1.763 | 0.848 |
| Bf | 0.704 | 0.704 | 0.704 |

Each value of the above-mentioned conditional formulas (1) to (4) and the focal length f3 of the third lens group G3 of a zoom lens in Example 4 are shown in Table 16.

TABLE 16 f3 = +3.5396

| (1) | (R3a + R3b)/fw · Fnow = 5.761 |
| (2) | D3a/fw = 1.545 |
| (3) | |R3b|/Db = 1.988 |
| (4) | f3/(fw · ft)$^{1/2}$ = 1.173 |

FIG. 15 to FIG. 17 show respectively diagrams of various aberrations in the infinite distance focusing state of a zoom lens according to Example 4 of the present invention. FIG. 15 shows diagrams of various aberrations in the wide-angle end condition (f=1.000), FIG. 16 shows diagrams of various aberrations in the intermediate focal length condition (f=4.091), and FIG. 17 shows diagrams of various aberrations in the telescopic end condition (f=9.100).

In each of these diagrams of various aberrations, solid lines in the spherical aberration diagram indicate spherical aberration, dotted lines indicate a sign condition, y indicates an image height, solid lines in the diagram of astigmatism indicate a sagittal image surface, and broken lines indicate a meridional image surface. The diagrams of coma aberration show coma aberration at image heights y=0, 0.269, 0.377, and 0.539, while A respectively shows an angle of view.

It is apparent from each diagram of aberration that various aberration is properly corrected in a zoom lens according to Example 4, having excellent image-forming performance.

While the structure and the numerical values shown in each Example mentioned above are only one example of what is to be embodied when implementing a zoom lens according to the present invention, it is to be understood that the technological scope of the present invention is by no means to be interpreted as restricted by what has been described.

According to the embodiment of the present invention, regardless of the lens positional status, a high variable magnification zoom lens capable of realizing high optical performance can be realized, whereby it is possible to provide a zoom lens suitably as the zoom lens applicable for various cameras, particularly, for digital still cameras and digital video cameras using image pick up element pick up elements which have made advances in miniaturization and high definition.

What is claimed is:

1. A zoom lens comprising:
a first lens group having positive refraction,
a second lens group having negative refraction,
a third lens group having positive refraction, and
a fourth lens group having positive fraction,
being arrayed in this order from an object side,
wherein, when a lens positional state changes from a wide-angle end condition to a telescopic end condition the first lens group and the third lens group are fixed in a predetermined position in an optical axis direction, as the second lens group moves towards an image side, fluctuation in an image position that is generated following a movement of the second lens group is compensated by a movement of the fourth lens group;
wherein when the lens positional state changes, an aperture stop set in the optical axis direction is provided on an object side of the third lens group; and
wherein the third lens group is constituted by a cemented lens including a positive lens wherein a convex surface thereof faces the object side and a negative lens in which a concave surface thereof faces the image side, and a positive lens, each being arrayed in this order from the object side.

2. The zoom lens according to claim 1, wherein: a following conditional formula (1) is met $$4<(R3a+R3b)/fw\cdot Fnow<7 \quad (1)$$

where R3a is a radius of curvature of a lens surface, which is closest to the object side, of the third lens group, R3b is a radius of curvature of a lens surface, which is closest to the image side, of the third lens group, fw is a focal length of an entire lens system in the wide-angle end condition, and Fnow is an aperture ratio in the wide-angle end condition.

3. The zoom lens according to claim 1, wherein a following conditional formula (2) is met $$1.1<D3a/fw \quad (2)$$

where D3a is a center thickness of the cemented lens provided in the third lens group.

4. The zoom lens according to claim 2, wherein the following conditional formula (2) is met $$1.1<D3a/fw. \quad (2)$$

5. The zoom lens according to claim 1, wherein:
the lens surface, which is closest to the image side, of the third lens group in which a convex face of the lens surface faces the object side; and.
a following conditional formula (3) is met $$1<51\ R3b|/Db<10 \quad (3)$$

where R3b is a radius of curvature of the lens surface, which is closest to the image side, of the third lens group, and Db is a space on an axis from the aperture stop to the lens surface, which is closest to the image side, of the third lens group.

6. The zoom lens according to claim 2, wherein:
the lens surface, which is closest to the image side, of the third lens group in which a convex face of the lens surface faces the object side; and
the following conditional formula (3) is met $$1<51\ R3b|/Db<10. \quad (3)$$

7. The zoom lens according to claim 3, wherein.
the lens surface, which is closest to the image side, of the third lens group in which a convex face of the lens surface faces the object side; and
the following conditional formula (3) is met $$1<|R3b|/Db<10. \quad (3)$$

8. The zoom lens according to claim 4, wherein.
the lens surface, which is closest to the image side, of the third lens group in which a convex surface of the lens surface faces the object side; and
the following conditional formula (3) is met $$1<|R3b|/Db<10. \quad (3)$$

9. The zoom lens according to claim 1, wherein a following conditional formula (4) is met $$0.9<f3/(fw\cdot ft)^{1/2}<1.3 \quad (4)$$

where f3 is a focal length of the third lens group and ft is a focal length of the entire lens system in the telescopic end condition.

10. The zoom lens according to claim 2, wherein the following conditional formula (4) is met $$0.9<f3/(fw\cdot ft)^{1/2}<1.3. \quad (4)$$

11. The zoom lens according to claim 3, wherein the following conditional formula (4) is met $$0.9<f3/(fw\cdot ft)^{1/2}<1.3. \quad (4)$$

12. The zoom lens according to claim 4, wherein the following conditional formula (4) is met $$0.9<f3/(fw\cdot ft)^{1/2}<1.3. \quad (4)$$

13. The zoom lens according to claim 5, wherein the following conditional formula (4) is met $$0.9<f3/(fw\cdot ft)^{1/2}<1.3. \quad (4)$$

14. The zoom lens according to claim 6, wherein the following conditional formula (4) is met $$0.9<f3/(fw\cdot ft)^{1/2}<1.3. \quad (4)$$

15. The zoom lens according to claim 7, wherein the following conditional formula (4) is met $$0.9<f3/(fw\cdot ft)^{1/2}<1.3. \quad (4)$$

16. The zoom lens according to claim 8, wherein the following conditional formula (4) is met $$0.9<f3/(fw\cdot ft)^{1/2}<1.3. \quad (4)$$

17. The zoom lens according to claim 1, wherein the cemented lens and the positive lens of the third lens group are provided with an air space between each other and in contact at a periphery of the lens outside a passing range of an effective flux of light.

18. The zoom lens according to claim 17, wherein the following conditional formula (1) is met $$4 < (R3a+R3b)/fw \cdot \text{Fnow} < 7 \quad (1)$$

where R3a is the radius of curvature of the lens surface, which is closest to the object side, of the third lens group, R3b is the radius of curvature of the lens surface, which is closest to the image side, of the third lens group, fw is the focal length of the entire lens system in the wide-angle end condition, and Fnow is the aperture ratio in the wide-angle end condition.

19. The zoom lens according to claim 17, wherein the following conditional formula (2) is met $$1.1 < D3a/fw \quad (2)$$

where D3a is the center thickness of the cemented lens provided in the third lens group.

20. The zoom lens according to claim 18, wherein the following conditional formula (2) is met $$1.1 < D3a/fw. \quad (2)$$

21. The zoom lens according to claim 17, wherein.
the lens surface, which is closest to the image side, of the third lens group in which a convex surface of the lens surface faces the object side; and
the following conditional formula (3) is met $$1 < |R3b|/Db < 10 \quad (3)$$

where R3b is the radius of curvature of the lens surface, which is closest to the image side, of the third lens group, and Db is the spacing on the axis from the aperture stop to the lens surface, which is closest to the image side, of the third lens group.

22. The zoom lens according to claim 18, wherein
the lens surface, which is closest to the image side, of the third lens group in which a convex surface of the lens surface faces the object side; and
the following conditional formula (3) is met $$(3) \quad 1 < |R3b|/Db < 10.$$

23. The zoom lens according to claim 19, wherein:.
the lens surface, which is closest to the image side, of the third lens group in whic surface of the lens surface faces the object side; and
the following conditional formula (3) is met $$1 < |R3b|/Db < 10. \quad (3)$$

24. The zoom lens according to claim 20, wherein
the lens surface, which is closest to the image side, of the third lens group in which a convex surface of the lens surface faces the object side; and
the following conditional formula (3) is met $$1 < |R3b|/Db < 10. \quad (3)$$

25. The zoom lens according to claim 17, wherein the following conditional formula (4) is met $$0.9 < f3/(fw \cdot ft)^{1/2} < 1.3 \quad (4)$$

where f3 is the focal length of the third lens group and ft is the focal length of the entire lens system in the telescopic end condition.

26. The zoom lens according to claim 18, wherein the following conditional formula (4) is met $$0.9 < f3/(fw \cdot ft)^{1/2} < 1.3. \quad (4)$$

27. The zoom lens according to claim 19, wherein the following conditional formula (4) is met $$0.9 < f3/(fw \cdot ft)^{1/2} < 1.3. \quad (4)$$

28. The zoom lens according to claim 20, wherein the following conditional formula (4) is met $$0.9 < f3/(fw \cdot ft)^{1/2} < 1.3. \quad (4)$$

29. The zoom lens according to claim 21, wherein the following conditional formula (4) is met $$0.9 < f3/(fw \cdot ft)^{1/2} < 1.3. \quad (4)$$

30. The zoom lens according to claim 22, wherein the following conditional formula (4) is met $$0.9 < f3/(fw \cdot ft)^{1/2} < 1.3. \quad (4)$$

31. The zoom lens according to claim 23, wherein the following conditional formula (4) is met $$0.9 < f3/(fw \cdot ft)^{1/2} < 1.3. \quad (4)$$

32. The zoom lens according to claim 24, wherein the following conditional formula (4) is met $$0.9 < f3/(fw \cdot ft)^{1/2} < 1.3. \quad (4)$$

* * * * *

UNITED STATES PATENT AND TRADEMARK OFFICE
CERTIFICATE OF CORRECTION

PATENT NO.       : 7,199,941 B2
APPLICATION NO. : 10/963563
DATED            : April 3, 2007
INVENTOR(S)      : Motoyuki Ohtake It is certified that error appears in the above-identified patent and that said Letters Patent is hereby corrected as shown below:

<u>Column 20:</u>
Line 7 should be read as follows:
-- $1<|R3b|/Db<10$ --.

<u>Column 20:</u>
Line 19 should be read as follows:
-- $1<R3b|/Db<10$ --.

<u>Column 22, Line 3:</u>
"in wic surface" should read -- in which a convex surface --.

Signed and Sealed this

Seventh Day of August, 2007

JON W. DUDAS
*Director of the United States Patent and Trademark Office*